US008890931B2

(12) United States Patent
Tsang et al.

(10) Patent No.: US 8,890,931 B2
(45) Date of Patent: Nov. 18, 2014

(54) FAST GENERATION OF HOLOGRAMS

(75) Inventors: Peter Wai Ming Tsang, Hong Kong (CN); Kayton Wai Keung Cheung, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 538 days.

(21) Appl. No.: 13/185,473

(22) Filed: Jul. 18, 2011

(65) Prior Publication Data

US 2012/0050460 A1  Mar. 1, 2012

Related U.S. Application Data

(60) Provisional application No. 61/377,288, filed on Aug. 26, 2010.

(51) Int. Cl.
*H04N 5/89* (2006.01)
*H04N 13/00* (2006.01)
*G03H 1/08* (2006.01)

(52) U.S. Cl.
CPC ....... *G03H 1/0808* (2013.01); *G03H 2210/441* (2013.01); *G03H 2210/454* (2013.01); *G03H 2001/0825* (2013.01); *G03H 2210/42* (2013.01); *G03H 2210/30* (2013.01)
USPC .......................................................... 348/40

(58) Field of Classification Search
None
See application file for complete search history.

(56) References Cited

U.S. PATENT DOCUMENTS 5,668,648 A * 9/1997 Saito et al. ................... 359/9
7,295,200 B2 11/2007 Cameron et al.
7,564,606 B2 7/2009 Kitamura
2004/0188393 A1* 9/2004 Li et al. .................... 219/121.7
2011/0002019 A1* 1/2011 Routley et al. .................. 359/9
2011/0228365 A1* 9/2011 Tsang et al. ..................... 359/9
2011/0273725 A1* 11/2011 Milvich ........................ 356/616

OTHER PUBLICATIONS

Peter Tsang, Jung-Ping Liu, Wai-Keung Cheung, and Ting-Chung Poon, "Fast generation of Fresnel holograms based on multirate filtering," Appl. Opt. 48, H23-H30 (2009).
S.C. Kim and E.S. Kim, "Fast computation of hologram patterns of a 3D object using run-length encoding and novel look-up table methods," Appl. Opt. 48, pp. 1030-1041, 2009.
Hironobu Sakata and Yuji Sakamoto, "Fast computation method for a Fresnel hologram using three-dimensional affine transformations in real space," Appl. Opt. 48, H212-H221 (2009).

(Continued)

*Primary Examiner* — Dave Czekaj
*Assistant Examiner* — Tyler W Sullivan
(74) *Attorney, Agent, or Firm* — Amin, Turocy & Watson, LLP

(57) ABSTRACT

Systems, methods, and devices that generate and display a holographic image(s) of a 3-D real or synthetic object scene are presented. A holographic generator component (HGC) partitions a 3-D object scene into a horizontal stack of regularly spaced vertical sub-planes that are each contributed to a respective sub-line. The HGC converts the sequence of sub-lines into a collection of diffraction patterns, which are summed up and interfered with a reference beam to generate the complete hologram, which can be or can approximate a Fresnel hologram. A multi-rate filter is employed to facilitate converting sub-lines to diffraction patterns more quickly. The multi-rate filtering can be realized using convolution in the spatial domain, realized in the frequency domain using a fast Fourier transform, and/or realized in the frequency domain using a graphic processing unit.

20 Claims, 25 Drawing Sheets

(56) References Cited

OTHER PUBLICATIONS

V.L. Tuft et al, "Holovision 2.2 user's manual", http://www2.edge.no/projects/holovision/doc/holovision_221_manual.pdf, 2001.

H. Yoshikawa and K. Takei, Development of a compact direct fringe printer for computer-generated holograms, SPIE Proc. of Prac. Hobo. XVIII, vol. 5290-42, Jan. 2004.

H. Yoshikawa and M. Tachinami, "Development of direct fringe printer for computer-generated holograms," SPIE Proc. vol. 5742-259 (2005).

T.C. Poon, "Three-Dimensional Television Using Optical Scanning Holography," Journal of Information Display, 3, pp. 12-16 (2002).

T. Shimobaba, Y. Sato, J. Miura, M. Takenouchi, and T. Ito, "Real-time digital holographic microscopy using the graphic processing unit," Opt. Express 16, pp. 11776-11781 2008. http://www.opticsinfobase.org/view_article.cfm?gotourl=http%3A%2F%2Fwww%2Eopticsinfobase%2Eorg%2FDirectPDFAccess%2F59D89070%2D972C%2DDDDD5%2D81B1E4383599D0AF%5F170078%2Epdf%3Fda%3D1%26id%3D170078%26seq%3D0%26mobile%3Dno&org= , 6 pages.

L. Ahrenberg, "Computer generated holography using parallel commodity graphics hardware", Opt. Express, vol. 14, No. 17, pp. 7636-7641, 2006. http://graphics.tu-bs.de/media/publications/ahrenberg2006cghongpu.pdf , 6 pages.

Y. Seo, H. Cho, and D. Kim, "High-Performance CGH Processor for Real-Time Digital Holography," Laser App. Chem., Sec. and Env. Ana., OSA Tech. Digest (CD) (OSA, 2008), paper JMA9.

T. Shimobaba et. al, "Interactive color electroholography using the FPGA technology and time division switching method", IEICE Elec. Exp. vol. 5, No. 8, pp. 271-277 , 2008.

M. Lucente, "Interactive computation of holograms using a look-up table", J. Elec. Imag., vol. 2, pp. 28-34, 1993. citeseerx.ist.psu.edu/viewdoc/download?doi=10.1.1.11.345.

S.C. Kim, E.S. Kim, "Effective generation of digital holograms of three-dimensional objects using a novel look-up table method," Appl. Opt. 47, D55-D62, 2008.

P.P. Vaidyanathan, "Multirate systems and filter banks", Prentice Hall, 1993. Ch. 4 (4.1-4.5), pp. 100-151 Ch. 12 (12.4-12.8), pp. 545-546, 572-627.

T. Yamaguchi, G. Okabe, and H. Yoshikawa, "Real-time image plane full-color and full-parallax holographic video display system," Opt. Engg., 46, 125801, 2007.

H. Yoshikawa and H. Taniguchi, "Computer Generated Rainbow Hologram," Opt. Rev. 6, 118-123 (1999).

H. Yoshikawa and A. Kagotani, "Full Color Computer-Generated Rainbow Hologram with Enlarged Viewing Angle," Opt. Rev. 9, 251-254 (2002).

H. Yoshikawa, "Computer-Generated Holograms for white light reconstruction", Digital holography and three-dimensional dimensional display: principles and applications, edited by T. -C. Poon, Springer Verlag, May, 2006.

H. Yoshikawa "Fast computation of fresnel holograms employing difference", Optical Review, vol. 8, No. 5, pp. 331-335, 2001.

P.W.M. Tsang, J.P. Liu, T.C. Poon, K.W.K. Cheung, "Fast generation of hologram sub-lines based on Field Programmable Gate Array", OSA Opt. and Photon. Cong.: Dig. Holo. and 3D Imag. (accepted paper), 2009.

T.C. Poon, "Digital Holography and Three-Dimensional Display: Principles and Application", 2006.

\* cited by examiner

500

1400

1600

FAST GENERATION OF HOLOGRAMS

CROSS-REFERENCE TO RELATED APPLICATION AND CLAIM FOR PRIORITY

This application is a non-provisional of, and claims the benefit of priority to, U.S. Provisional Patent Application No. 61/377,288, filed Aug. 26, 2010, and titled "FAST GENERATION OF HOLOGRAMS," which is hereby incorporated herein by reference in their entirety.

TECHNICAL FIELD

The subject disclosure relates generally to image display(s), and in particular, to providing fast generation and display of three-dimensional (3-D) holographic images.

BACKGROUND

With the advancement of computers, digital holography (DH) has become an important area of interest that has gained much popularity. Research findings derived from this technology enable holograms to be generated with numerical means, wherein the holograms can be displayed using holographic devices, such as a liquid crystal on silicon (LCOS) display. Holograms generated in this manner are in the form of numerical data that can be recorded, transmitted, and processed using digital techniques. On top of that, the availability of high capacity digital storage and wide-band communication technologies also has lead to the emergence of real-time video holography, casting light on the future of 3-D television systems.

At present, development in DH has reached a reasonable degree of maturity, but at the same time, the heavy computation involved also imposes a major bottleneck in practical applications. Although some analytic methods have been proposed recently to overcome the problem, the shortening in the computation time has not been significant. For other methods that are based on a fast central processing unit (CPU) or Graphic Processing Unit (GPU), the hardware involved is complicated, expensive, and requires a substantial power supply.

One part of DH is computer generated holography (CGH), which is a method for digitally generating holographic interference patterns, wherein a holographic image can be generated, for example, by digitally computing a holographic interference pattern and printing it onto a mask or film for subsequent illumination by suitable coherent light source or using a holographic 3-D display (a display which operates on the basis of interference of coherent light) to present the holographic image without the need of having to fabricate a "hardcopy" of the holographic interference pattern each time. One of the major problems in CGH is the high computation cost involved in the calculation of the fringe patterns.

Recently, this particular CGH problem has been addressed by imposing the horizontal parallax only (HPO) constraint whereby the process can be simplified to the computation of one-dimension sub-lines each representing a scan plane of the object scene. Subsequently the sub-lines can be expanded to the two-dimensional (2-D) hologram through multiplication with a reference signal. Furthermore, a hardware solution is available with which sub-lines can be generated in a computationally free manner with high throughput of approximately 100 megapixels per second. Apart from decreasing the computation loading, the sub-lines can be treated as intermediate data, which can be compressed by down-sampling the number of sub-lines.

Despite these desirable features, the method is only suitable for the generation of white light (rainbow) holograms, not Fresnel holograms, and the resolution of the reconstructed image is inferior to the classical Fresnel hologram. Another drawback to such conventional hologram generation is that, if the hologram is illuminated with a monochrome beam, the viewing angle is narrow along the vertical direction. Still another drawback to such conventional hologram generation is that the scan planes are separated by a certain distance so that each holo-line will include an adequate number of rows in the hologram to support the diffraction along the vertical direction. As a result, the resolution of the scene image will be lowered, and further it may be necessary to further decrease the number of scan planes to lower the data rate (if the sub-lines are distributed through certain channels) and computation load, thereby resulting in even more degradation in the visual quality of the reconstructed holographic images.

Today, there is no way of quickly and efficiently generating Fresnel holograms having desirable visual quality and resolution, for example, to enable real-time generation and presentation of Fresnel holograms. Also, today, there is no way of maintaining a desirable viewing angle for the hologram along the vertical direction.

The above-described deficiencies of today's holographic techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview of the disclosed subject matter. It is intended to neither identify key or critical elements of the disclosed subject matter nor delineate the scope of the various embodiments disclosed herein. Its sole purpose is to present some concepts of the disclosed subject matter in a simplified form as a prelude to the more detailed description that is presented later.

The disclosed subject matter relates to systems, methods, and devices that can generate and display a holographic image(s) ("image(s)") of a 3-D real or synthetic object scene in accordance with various embodiments and aspects disclosed herein. In an aspect, a holographic generator component (HGC) can partition or segment (e.g., uniformly segment) a three-dimensional (3-D) object scene into a plurality of (e.g., a horizontal stack of) regularly spaced vertical sub-planes that are each contributed to a respective sub-line of a sequence of sub-lines. The HGC can convert the sequence of sub-lines into a collection of diffraction patterns, which can be summed up and interfered with using a reference beam to generate the complete hologram, which can be or can approximate a Fresnel hologram (e.g., two-dimensional (2-D) or three-dimensional (3-D) Fresnel hologram), representing the 3-D object scene. In another aspect, the HGC can employ a multi-rate filter to facilitate converting the sub-lines to diffraction patterns more quickly. In accordance with various aspects and embodiments, the multi-rate filtering can be realized using convolution in the spatial domain, realized in the frequency domain using fast Fourier transforms, and/or realized in the frequency domain using a graphic processing unit.

In an aspect, the disclosed subject matter can include a system, comprising a HGC configured to convert a 3-D object scene into a sequence of sub-lines and generate a Fresnel hologram representative of the 3-D object scene based at least in part on the sequence of sub-lines. The system can further comprise at least one display component configured to present the Fresnel hologram.

In another aspect, the disclosed subject matter can include a method, comprising the act of converting a 3-D object scene into a sequence of sub-lines to facilitate generating a diffraction pattern representative of the 3-D object scene. The method can further include the act of converting the sequence of sub-lines to a hologram representative of the 3-D object scene based at least in part on a multi-rate filtering of the sequence of sub-lines.

In still another aspect, the disclosed subject matter can include a system, comprising means for segmenting a 3-D object scene into a vertical stack of scan planes including means for converting the 3-D object scene into a sequence of sub-lines, wherein scan planes of the vertical stack correspond to respective sub-lines in the sequence of sub-lines. The system can further comprise means for converting the sequence of sub-lines into a Fresnel hologram representative of the 3-D object scene including means for multi-rate filtering the sequence of sub-lines.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
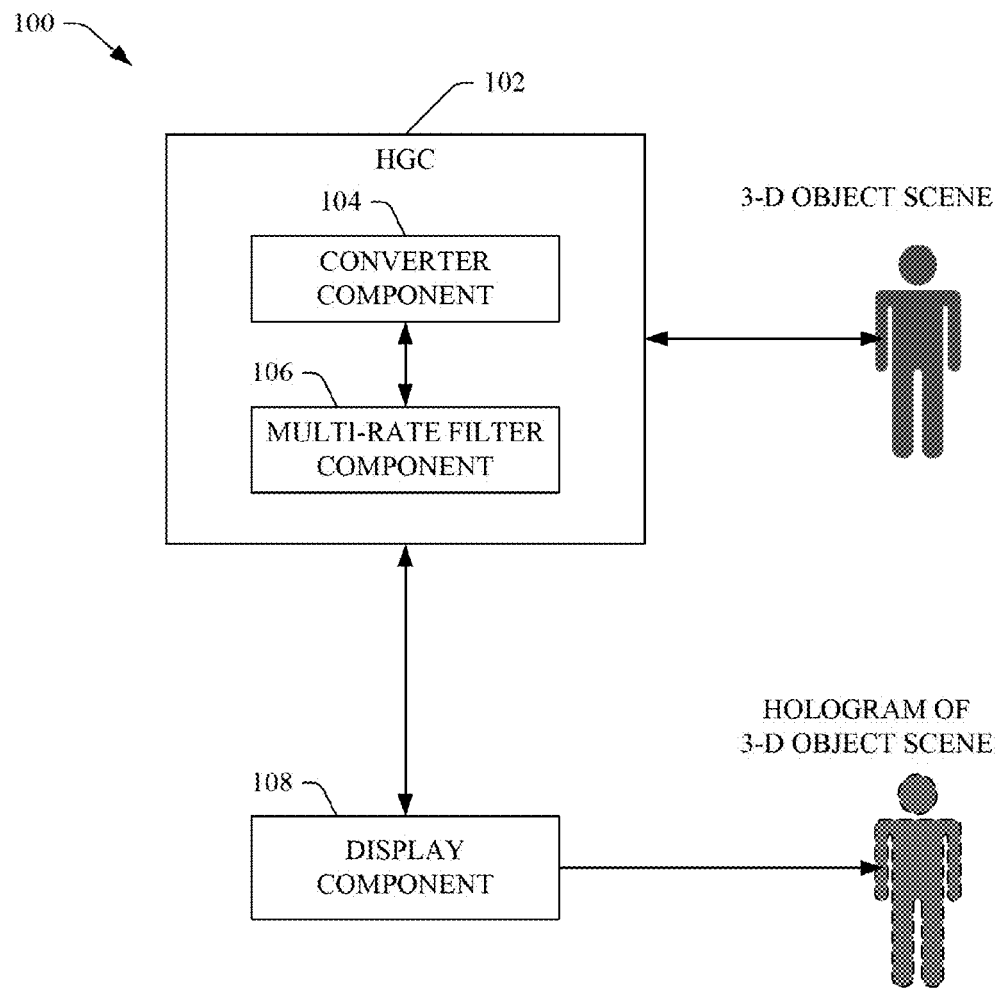
FIG. 1 illustrates a block diagram of an example system that can desirably generate a hologram (e.g., Fresnel hologram) representing a three-dimensional (3-D) object scene in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

The advancement of computing technology in the last two decades has enabled holograms to be generated numerically from three-dimensional (3-D) models that do not actually exist in the real world. The process, commonly known as computer generated holography (CGH) provides an alternative means to the traditional, and often complicated, way of capturing holograms of physical objects with optical means which requires the use of laser beams and precision setup of optical equipments. Given a set of 3-D object points $O=[o_0$ $(x_0, y_0, z_0), o_1(x_1, y_1, z_1), \ldots, o_{N-1}(x_{N-1}, y_{N-1}, z_{N-1})]$, the diffraction pattern D(x, y) can be generated numerically with the following equation.

$$D(x, y) = \sum_{j=0}^{N-1} \frac{a_j}{r_j} \exp(ikr_j) = \sum_{j=0}^{N-1} \left[ \frac{a_j}{r_j} \cos(kr_j) + i\frac{a_j}{r_j} \sin(kr_j) \right] \quad (1)$$

where $a_j$ and $r_j$ represent the intensity of the "jth" point in O and its distance to the position (x, y) on the diffraction plane, $$k = \frac{2\pi}{\lambda}$$

is the wavenumber and $\lambda$ is the wavelength of the reference beam. Subsequently, a hologram H(x, y) can be generated by adding a reference beam to the diffraction pattern.

In addition, the availability of an electronically-accessed spatial light modulator (SLM) and a liquid crystal on silicon (LCOS) also allows the computer generated holograms to be displayed in real time without the need of producing hardcopies with photographic techniques or an expensive fringe writer.

There are at least two major issues associated with conventional CGH. First, the computational loading in generating a hologram is extremely high even with the standard of modern computers. For a hologram with horizontal and vertical resolution of X×Y pixels, straightforward computation based on Eq. (1) will involve 2×X×Y×N multiplication operations with the assumption that all the sinusoidal terms have been pre-computed in advance and stored in look-up tables. Second, due to high data-rate of holographic signals, it can be difficult to distribute or record them via existing video chains.

For small hologram size and moderate number of object points, the first problem can be handled directly with the use of commodity hardware such as a Graphical Processing Unit (GPU) and a Field Programmable Gate Array (FPGA). However, it is likely that the complexity and cost of the hardware will increase with the size and number of object points. To address the problem from a more fundamental and analytic perspective, one potential solution is to use a pre-computed look-up table at the expense of using enormous amount of memory in storing the fringe patterns. Efforts have been made to reduce the memory requirement for pre-computed look-up tables with a modicum of success. Other methods for generating holograms include generating image holograms in real time with the constraints that the scene objects must be positioned at a close proximity to the hologram, and generating Horizontal Parallax Only (HPO) Rainbow holograms which overcomes both of the aforementioned problems, although with the limitation that the holograms are only rainbow holograms.

In the latter approach, a 3-D object scene is first partitioned into a vertical stack of regularly spaced scan planes. Each scan plane contains a certain number of object points. These object points generate a diffraction pattern on the hologram plane, and only the line with the same vertical height of the scan plane is taken into account. The line containing the diffraction pattern of the object is called a "sub-line". More recently, a solution based on a single, standalone FPGA device for generation of sub-line pixels with a throughput of 100M pixels per second has been proposed. The speed is generally high enough for holographic video applications. Differing the standalone FPGA device from the aforementioned FPGA solutions, the technique that employs the standalone FPGA device is designed for generating sub-lines instead of full hologram.

With each sub-line, a one-dimensional (1-D) hologram referred to as a "holo-line" can be generated for each of the scan plane by adding an off-axis reference beam. A collection of these holo-lines becomes a full two-dimensional (2-D) hologram. The method can be much faster than the direct generation of a Fresnel hologram, and the computation time can be further reduced by down-sampling the number of sub-lines (e.g., increasing the separation between adjacent scan planes).

Despite the capabilities of the above method employing the standalone FPGA device, there are at least three major limitations. First, this method is designed for generating rainbow, or white light holograms, which may cause color changes as the view point is varied. Second, if the hologram is illuminated with monochrome beam, the viewing angle is narrow along the vertical direction. Third, the scan planes are separated by a certain distance so that each holo-line will include adequate number of rows in the hologram to support the diffraction along the vertical direction. As a result, the resolution of the scene image will be lowered (e.g., lower than a desired resolution). In addition, it may be necessary to further decrease the number of scan planes to lower the data rate (e.g., if the sub-lines are distributed through certain channels) and computation load, resulting in even more degradation in the visual quality of the reconstructed images.

To facilitate overcoming the aforementioned deficiencies of the conventional hologram-generating devices and techniques, the subject specification provides techniques for fast generation of holograms (e.g., Fresnel holograms) of a 3-D real or synthetic object scene in accordance with various embodiments and aspects disclosed herein. In an aspect, the task of hologram formation is first decomposed into a pair of 1-D processes. The first stage is the conversion of a 3-D scene into a sequence of 1-D hologram sub-lines. It is recognized that such approach in the first stage also can lead to a substantial increase in the computation loading. To overcome this issue, the disclosed subject matter can include a second stage that can employ a multi-rate filtering process to convert the 1-D hologram sub-lines into a Fresnel hologram or an approximation of a Fresnel hologram. The second stage can be implemented using a fast Fourier transform (FFT) in the frequency domain and/or realized using a convolution process in the spatial domain, for example.

Evaluation and experimental results reveal that for holograms of moderate size, the disclosed subject matter is capable of generating a Fresnel hologram as much as 40,000 times faster than generation of a Fresnel hologram by calculation of the Fresnel hologram based on the conventional pre-computed table look-up method. The disclosed subject matter can generate a hologram (e.g., 2-D or 3-D Fresnel hologram) of a 3-D object scene whereby global vertical parallax can be preserved for the 3-D object scene as a whole and the reconstructed holographic image can be observed easily, although there may be no relative vertical parallax between object points at different distance plane.

Turning to the figures, FIG. 1 illustrates a block diagram of an example system 100 that can desirably generate a hologram (e.g., 2-D or 3-D Fresnel hologram) representing a 3-D object scene in accordance with various aspects and embodiments of the disclosed subject matter. In an aspect, the system 100 can include a holographic generator component (HGC) 102 that can desirably generate a hologram (e.g., sequence of 3-D holographic images) that represents a 3-D object scene (e.g., real or computer-synthesized 3-D object scene). The HGC 102 can execute a multi-stage process to generate the 3-D hologram and present it for display, as disclosed herein.

Figure 2:
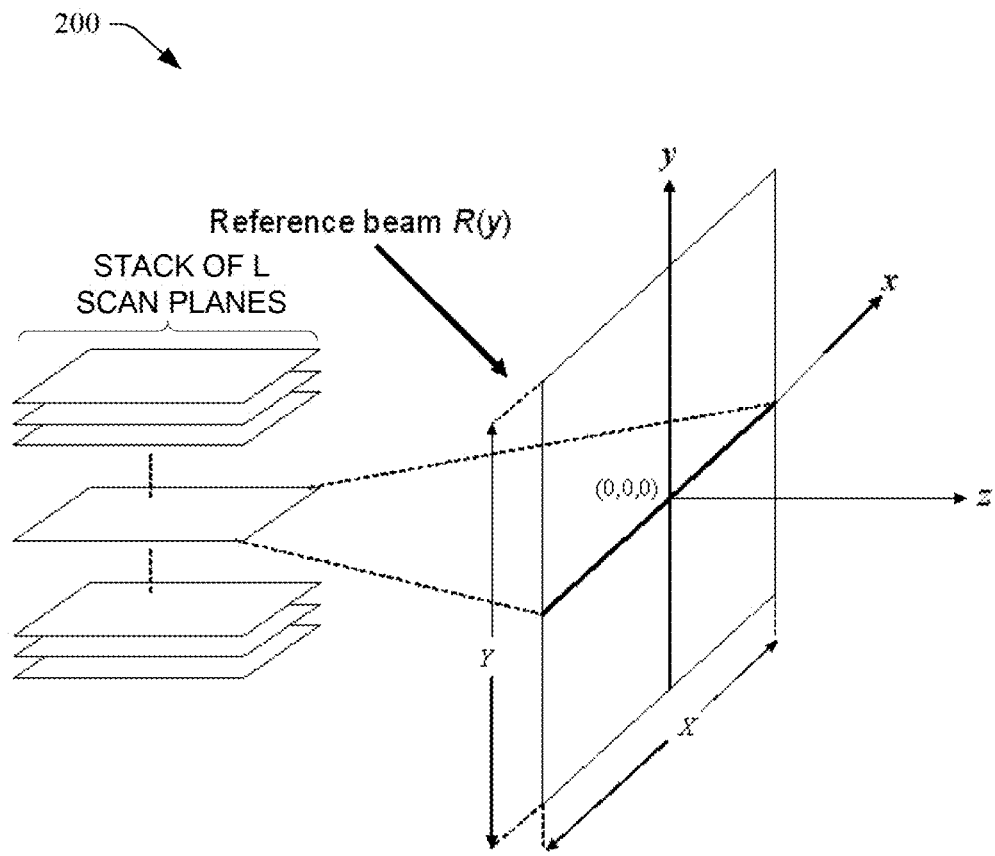
FIG. 2 depicts a diagram of an example technique for generation of a hologram of a 3-D scene in accordance with various aspects of the disclosed subject matter.
Figure 3:
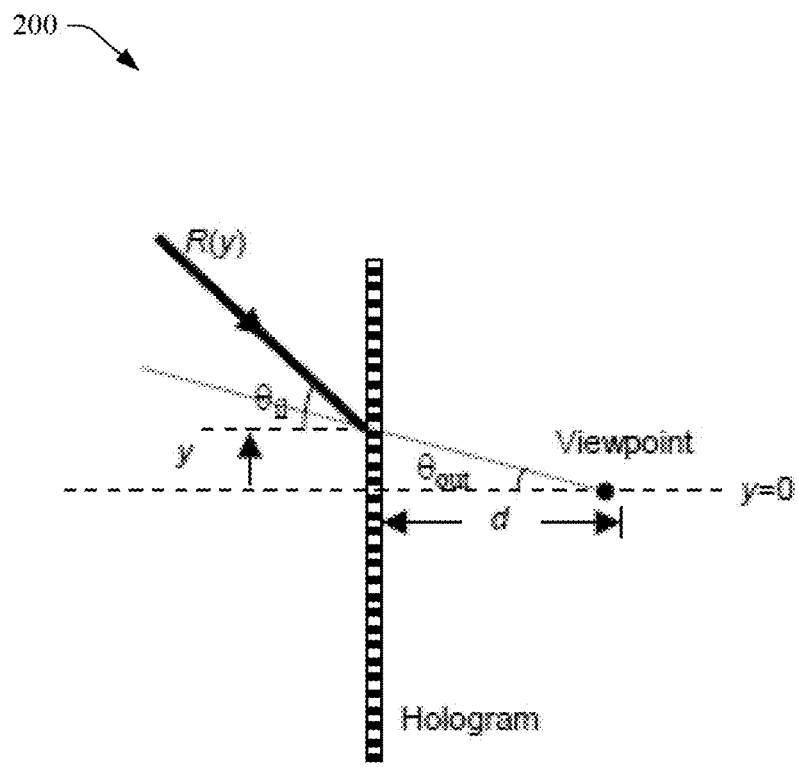
FIG. 3 illustrates a side-view diagram of the example technique in accordance with an aspect of the disclosed subject matter.
Figure 4:
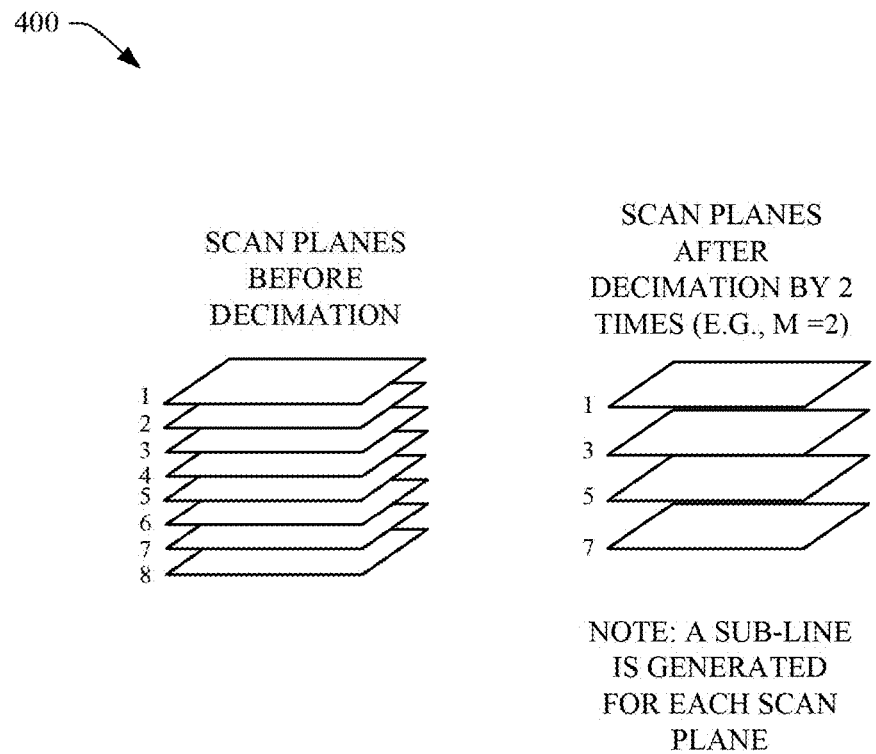
FIG. 4 depicts a diagram of an example sub-line decimation that shows decimation of a subset of sub-lines in accordance with an aspect of the disclosed subject matter.

Referring briefly to FIGS. 2-4 (along with FIG. 1), FIGS. 2-4 relate to generation of a 2-D HPO hologram of a 3-D scene. Aspects of the generation of a 2-D HPO hologram can be expandable or extendible to generation of a 3-D Fresnel hologram of a 3-D object scene. FIG. 2 depicts a diagram of an example technique 200 for generation of a hologram of a 3-D scene in accordance with various aspects of the disclosed subject matter, and FIG. 3 illustrates a side-view diagram of the example technique 200 (without the scan planes shown) for incident angle $\theta_{il}$, wherein d is the distance between the hologram and the viewer, in accordance with an aspect of the disclosed subject matter. A 3-D scene comprising of a set of self-illuminated object points is first partitioned into a stack of L regularly spaced horizontal scan planes, as shown in FIG. 2. A hologram comprising of X columns and Y rows of pixels is to be generated from the object points. Since HPO is assumed, for instance, a point object at $(x_j, 0, z_j)$ on a scan plane at vertical position y=0 will contribute to a 1-D horizontal sub-line of object beam O(x) given by $$O(x) = \sum_{j=0}^{N-1} \frac{a_j}{r_j} \exp(ikr_j) \tag{2}$$

where $i=\sqrt{-1}$ and $k=2\pi/\lambda$ is the wave number of the light with $\lambda$ being the wavelength of the laser; $a_j$ and $r_j=\sqrt{(x-x_j)^2+z_j^2}$ represent the amplitude of the 'jth' object point and its distance to the horizontal position x of the hologram; and N is the total number of object points.

On the hologram plane, e.g., the x-y plane shown in FIG. 2, the sub-line can be interfered with a reference beam R(y) to form a "holo-line" given by $$h(x,y)=Re[O(x)R*(y)] \text{ for } -\Delta y/2 \leq y \leq \Delta y/2 \tag{3}$$

where $\Delta y$ is the separation of the scan-plane as well as the height of a holo-line. A full 2-D HPO-hologram can be computed by stacking up the array of holo-lines from each scan-plane positioned at the corresponding vertical level of the latter. Depending on the distribution media, the spacing of the scan planes can be decreased to suit the channel bandwidth and resolution of the reconstructed images. For example, one approach is to down-sample the scan planes by M times (wherein such down-sample process also can be referred to as decimation in the context of multi-rate processing), resulting in a reduction on the sub-lines as well as the computation loading by a corresponding (e.g., equal) proportion. FIG. 4 depicts a diagram of an example sub-line decimation 400 that shows decimation of a subset of sub-lines when M=2 in accordance with an aspect of the disclosed subject matter. As can be seen in the example sub-line decimation 400, the sub-lines 1 through 8 can be decimated by a factor of 2 (since M=2), which can result in sub-lines 2, 4, 6, and 8 being removed or eliminated, leaving sub-lines 1, 3, 5, and 7, and empty gaps where sub-lines 2, 4, 6, and 8 had previously been.

It can be inferred from FIG. 4, the description related thereto, and other aspects of the disclosed subject matter, that widening the separation between the scan planes with decimation will result in regularly spaced horizontal blank lines in the reconstructed images. Although the gaps resulting from decimation can be filled up by duplicating the neighboring sub-lines, the degradation in the visual quality can be rather prominent to human perception, and also can escalate with increasing values of M.

With regard to generation of Fresnel holograms of 3-D object scenes, in accordance with various aspects, the HGC 102 can comprise a converter component 104 that can convert a 3-D object scene into a desired diffraction pattern to facilitate generation of the corresponding 3-D hologram. In one aspect, the converter component 104 can partition (e.g., decompose, segment) a 3-D object scene, comprising a set of self-illuminated object points (e.g., 3-D object points), into a vertical stack of regularly spaced horizontal scan planes. For example, the converter component 104 can uniformly segment the 3-D object scene into a vertical stack of scan planes, wherein each of the sub-lines can be respectively associated with a scan plane. From the scan planes, the HGC 102 can generate the hologram (e.g., 2-D or 3-D Fresnel hologram), comprising X columns and Y rows of pixels, in accordance with the aspects disclosed herein. For instance, Eq. (1) can be expanded for object points located on a scan plane at $y=\tau$ (refer to FIG. 2 for the definition of the coordinate system, for example), wherein, for each object point on the scan plane at $y=\tau$, a diffraction pattern can be generated on the hologram plane as $$D_\tau(x, y) = \sum_{j=0}^{N(\tau)} \frac{a(\tau)_j}{r_j} \exp\left(ik\sqrt{(x-x_j)^2 + (y+\tau)^2 + z_j^2}\right) \tag{4}$$

where $N(\tau)$ is the number of object points on the scan plane at $y=\tau$; and $a(\tau)_j$ and $z_j$ are the amplitude of the 'jth' object point, and its perpendicular distance to the hologram, respectively. In accordance with an aspect of the disclosed subject matter, if $z_j$ is sufficiently far away, Fresnel approximation can be taken and Eq. (4) can be rewritten as $$D_\tau(x, y) \approx \sum_{j=0}^{N(\tau)} \frac{a(\tau)_j}{r_j} \exp\left(ik\frac{(x-x_j)^2 + (y+\tau)^2}{2z_j}\right) \tag{5}$$

$$= \sum_{j=0}^{N(\tau)} \frac{a(\tau)_j}{r_j} \exp\left(ik\frac{(x-x_j)^2}{2z_j}\right) \exp\left(ik\frac{(y-\tau)^2}{2z_j}\right)$$

$r_j$ is the distance from the object point to a location (x, y) on the hologram, and is assumed to be a constant $r_0$ for large values of $z_0$.

An assumption can be made that the range of depth of the object points is small and centered at $z=z_0$, which is a condition that is rather common in practice. As a result, when the assumption is made that $z_j$ is close to $z_0$, the expression in Eq. (5) can be decomposed into the product of a pair of terms given by $$D_\tau(x, y) = \exp\left(ik\frac{(y-\tau)^2}{2z_0}\right) \sum_{j=0}^{N(\tau)} \frac{a(\tau)_j}{r_0} \exp\left(ik\frac{(x-x_j)^2}{2z_j}\right) \tag{6}$$

$$= B(y-\tau)O(x, \tau)$$

wherein $$B(y-\tau) = \exp\left(ik\frac{(y-\tau)^2}{2z_0}\right),$$

$$\text{and } O(x, \tau) = \sum_{j=0}^{N(\tau)} \frac{a(\tau)_j}{r_0} \exp\left(ik\frac{(x-x_j)^2}{2z_j}\right)$$

and wherein the term $O(x, \tau)$ is a 1-D signal representing the sub-line of the scan plane at $y=\tau$. The approximation of Eq. (6) can result in a change in aspect ratio on the reconstructed image of the scene object, but the deviation is generally not noticeable for a small range of z. In accordance with various aspects, the converter component 104 can employ any of Eqs. (4 through 6) to facilitate generating respective diffraction patterns representative of respective object points of the 3-D object scene.

It is noted that the proposed algorithm in Eq. (6) is quite distinct from that used in Eq. (3). In relation to Eq. (6), each scan plane can produce diffraction pattern along x and at the same time, the "holo-line" covers the entire y direction. In other words, along the y direction, there are overlapping patterns for the scan planes. In an aspect, this formalism, as is more fully described herein, can save a tremendous amount of computation as compared to that in the classical straightforward calculation of the Fresnel hologram, especially when the size of the hologram becomes large.

Figure 5:
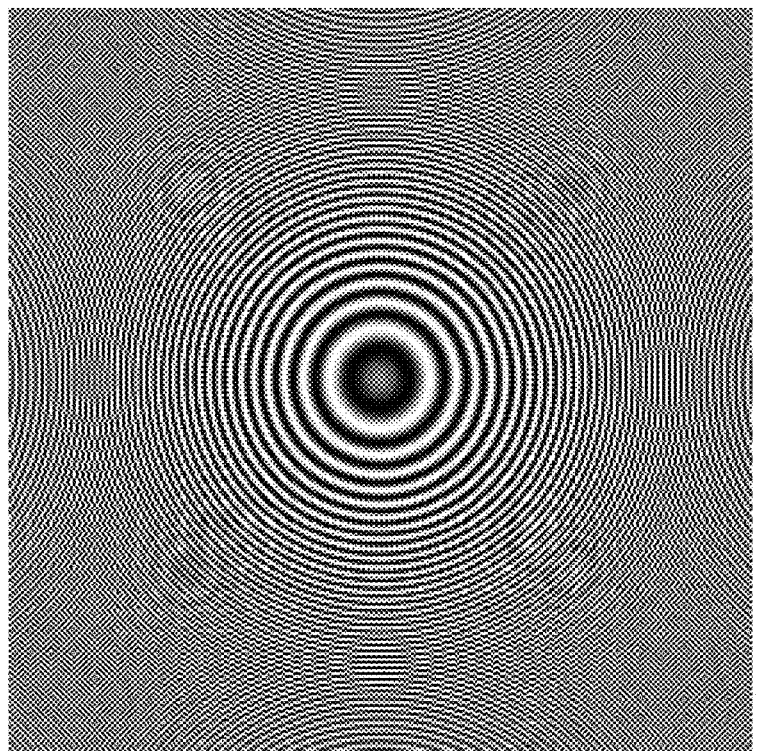
FIG. 5 depicts an image of an example diffraction pattern.
Figure 6:
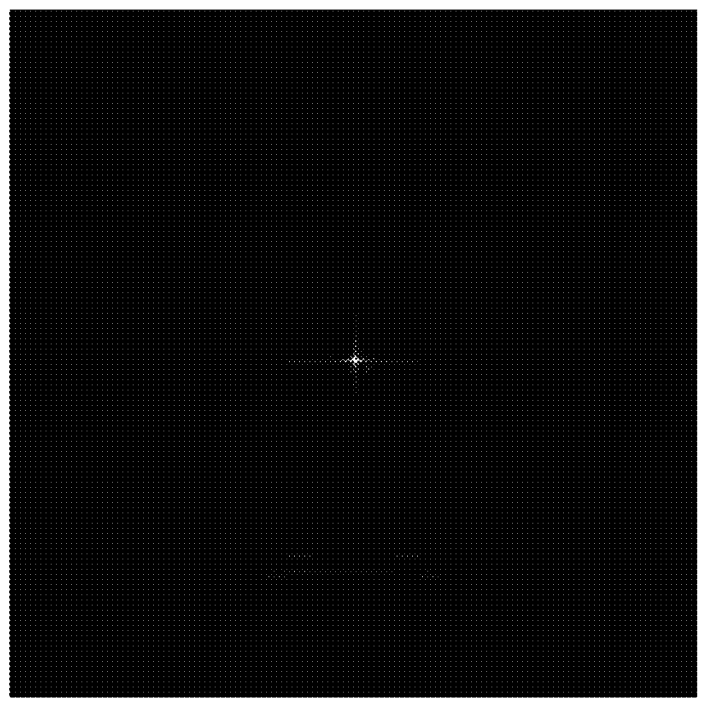
FIG. 6 illustrates a simulated reconstructed image obtained in response to the diffraction pattern being interfered with a reference beam at a specified angle.
Figure 7:
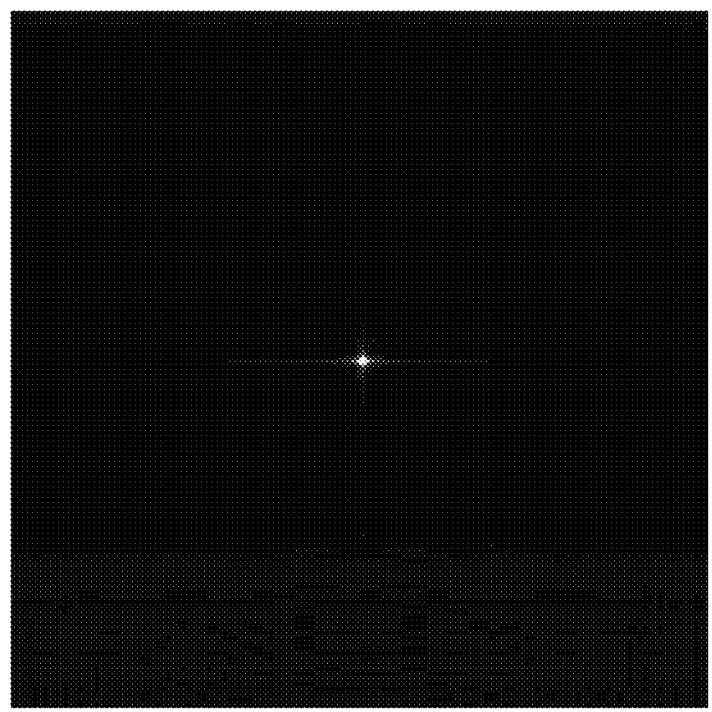
FIG. 7 depicts an example image result with a moved point source.

To illustrate the above, FIGS. 5-7 depict an example diffraction pattern 500 in accordance with an aspect of the disclosed subject matter. FIG. 5 depicts an image of an example diffraction pattern 500 that is recorded at a wavelength of 632 nanometers (nm) and an image resolution of 20 um, of a single point source positioned at (0, 0, −0.5 m). FIG. 6 illustrates a simulated reconstructed image 600 obtained with HOLOVISION in response to the diffraction pattern 500 being interfered with a reference beam at an angle of θ=1°. FIG. 7 illustrates an example image result 700 of the hologram (e.g., reconstructed image) with the point source moved to −0.496 meters (m). In FIG. 7, it can be seen the point is only slightly blurred. In practice the blurring is mainly along the vertical direction, and not prominent for small difference between $z_o$ and $z_j$.

Based on the above evaluation, other aspects of the disclosed subject techniques for fast Fresnel hologram generation can be presented as follows. In an aspect, the object beam O(x) in Eq. (6) can be generalized to scan planes at other vertical positions as $$O(x, \tau) = \sum_{j=0}^{N(\tau)} \frac{a_j}{r_j} \exp\left(ik\frac{(x-x_j)^2}{2z_j}\right)\bigg|_{y=\tau} \quad (7)$$

At this point, it can be assumed that there is no down-sampling (or decimation) on the scan planes so that the scene image and the hologram can have identical vertical extent. In other words, the number of scan planes L is equal to the number of hologram pixels Y along the vertical direction. As disclosed herein, it can be shown that this assumption can be desirably relaxed, in accordance with aspects of the disclosed subject matter.

Figure 8:
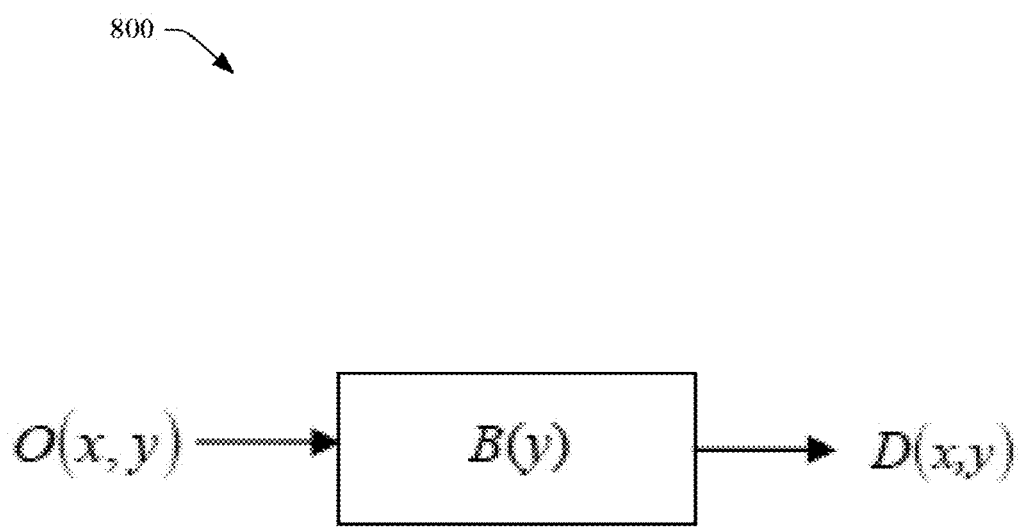
FIG. 8 illustrates a block diagram of an example filter that can be employed to generate a desired diffraction pattern from a received subset of sub-lines that can represent a 3-D object scene.

It is noted that Eq. (6) describes the diffraction pattern on the hologram plane from a single scan plane. In accordance with an aspect, the HGC 102 can include a multi-rate filter component 106 that can employ a multi-rate filtering process, as more fully disclosed herein, to facilitate converting the object waves of the 3-D object scene to a diffraction pattern for use in generating the hologram of the 3-D object scene. In one aspect, the multi-rate filter component 106 can identify or determine the diffraction pattern generated from all of the scan planes by integrating the individual contributions associated with the respective scan planes. For example, the multi-rate filter component 106 can identify or determine the diffraction pattern by integrating the individual contributions as (e.g., the contributions from all the scan planes can be generalized to)

$$D(x, y) = \sum_\tau D_\tau(x, y) = \sum_\tau [O(x, \tau)B(y - \tau)] \quad (8)$$

wherein, if L=Y, Eq. (8) can be recognized as a convolution process as shown in FIG. 8, which can be rewritten as or represented by $$D(x,y)=O(x,y)*B(y) \quad (9)$$

where * in Eq. (9) denotes convolution operation along the y direction. Eq. (9) can be viewed and depicted as a filtering process as shown in FIG. 8, which depicts a block diagram of an example filter 800 that can be employed to generate a diffraction pattern from a received subset of sub-lines (e.g., sequence of sub-lines) that can represent a 3-D object scene. The filter 800 can be employed by the multi-rate filter component 106, for example. In an aspect, the filter 800 can receive the subset of sub-lines and can apply a desired function, such as B(y) to filter the subset of sub-lines O(x, y) and generate a diffraction pattern D(x, y) as an output.

It is noted that the assumption made in Eqs. (4) and (5) is that the number of sub-lines is the same as the number of rows in the hologram. However, this implies that the data-rate of the collection of sub-lines will be identical to that of the hologram. As disclosed herein, the number of sub-lines can be made smaller than the number of pixels along the vertical extent of the hologram in order to desirably reduce the data rate. This can be accomplished, for example, by employing the converter component 104 to decimate (or down-sample) the scan planes, and hence the resulting number of sub-lines, by a desired factor, such as a factor (e.g., decimation factor) of M times, wherein M can be virtually any desired number. It is noted that decimation or down-sampling the number of sub-lines of the sub-line sequence can reduce the size of the intermediate data used to facilitate hologram generation, but, if the decimation factor is too large, blank gaps can appear in between the sampled (e.g., remaining) sub-lines in the sequence, and such blank gaps can result in degradation of the visual quality of the hologram. In an aspect, the disclosed subject matter can advantageously reduce or minimize the effects of decimation by employing a multi-rate filtering process, as more fully disclosed herein. It also is noted that the decimation process will lead to a difference in sampling rate between O(x, y) and B(y), and if such difference in sampling rate is not accounted for, the convolution process depicted in Eq. (9) would no longer be applicable.

In this regard, in an aspect, the multi-rate filter component 106 can be associated with the converter component 104, and can apply a desired multi-rate filtering process to facilitate overcoming the sampling-rate issue and generating the hologram from the 3-D object scene using the generated diffraction pattern associated with the 3-D object scene. For instance, the multi-rate filter component 106 can be employed to facilitate rectifying the discrepancy between the sampling rate between O(x, y) and B(y) to facilitate allowing the convolution process to be applicable by employing a multi-filtering process to the decimated sub-lines associated with the diffraction pattern relating to the 3-D object scene. In an aspect, the multi-rate filter component 106 can receive the decimated (or down-sampled) sub-lines from the converter component 104, and can up-sample the decimated or down-sampled sub-lines by a desired factor (e.g., M times) along the y direction prior to performing the convolution process, wherein the desired factor can be determined as a function of or in accordance with the amount of decimation or down-sampling applied to the sub-line sequence. The multi-rate filter component 106, performing the up-sampling process, can insert a specified number of blank lines (e.g., M−1 blank sub-lines) in between each pair of decimated sub-lines, hence resulting in empty gaps in between each pair of decimated sub-lines, wherein the number of blank lines can be determined based at least in part on the factor employed for up-sampling (or down-sampling) of the sub-line sequence.

It is noted that the empty gaps in the sub-line sequence can result in degradation of the visual quality of the generated hologram. However, when the computation is posed as the convolution process, such as a convolution process that employs Eq. (11), as disclosed supra, the multi-rate filter component 106 can employ an interpolation filter to suppress the empty gaps prior to interfering with the reference beam, wherein the multi-rate filtering can thereby provide desired computational efficiency, which is another advantage of the algorithm proposed in Eq. (6).

Figure 9:
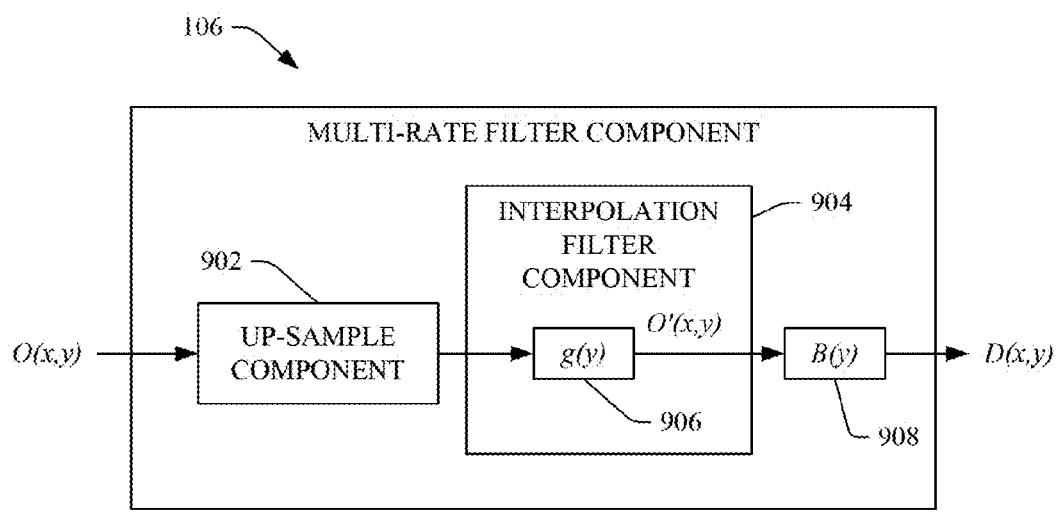
FIG. 9 depicts an example multi-rate filter component in accordance with an embodiment.

To provide an example illustration of multi-rate filtering, referring briefly to FIG. 9 (along with FIG. 1), depicted is an example multi-rate filter component 106 in accordance with an embodiment. The multi-rate filter component 106 can receive (e.g., from the converter component 104) O(x, y), which can comprise the decimated or down-sampled sub-lines of a subset of sub-lines associated with a 3-D object scene. The multi-rate filter component 106 can include an up-sample component 902 that can up-sample the sub-lines to insert a specified number of blank lines (e.g., M−1 blank sub-lines) in between each pair of decimated sub-lines in the subset of sub-lines, which can thereby result in empty gaps in between each pair of remaining sub-lines (e.g., sub-lines remaining after decimation) in the subset so that the number of sub-lines (including the empty gaps or "empty sub-lines") is equal to the number of rows in the hologram. The multi-rate filter component 106 also can employ an interpolation filter component 904 that can receive the subset of sub-lines, as desirably up-sampled (e.g., to up-sample the decimated sub-set of sub-lines so that the sampling rate between O(x, y) and B(y) is the same), and can employ an interpolation filter that can apply a desired impulse response, such as impulse response g(y) 906, to the up-sampled subset of sub-lines to facilitate suppressing the empty gaps in the subset of sub-lines prior to interfering the diffraction pattern associated with the sub-lines with the reference beam. The output from the interpolation filter component 904 can be O'(x, y). By suppressing any blank gaps between the sampled sub-lines of the sub-line sequence that are caused by decimation, the interpolation filter component 904 can thereby facilitate reconstructing missing information in the such blank regions of the sub-line sequence.

Figure 19:
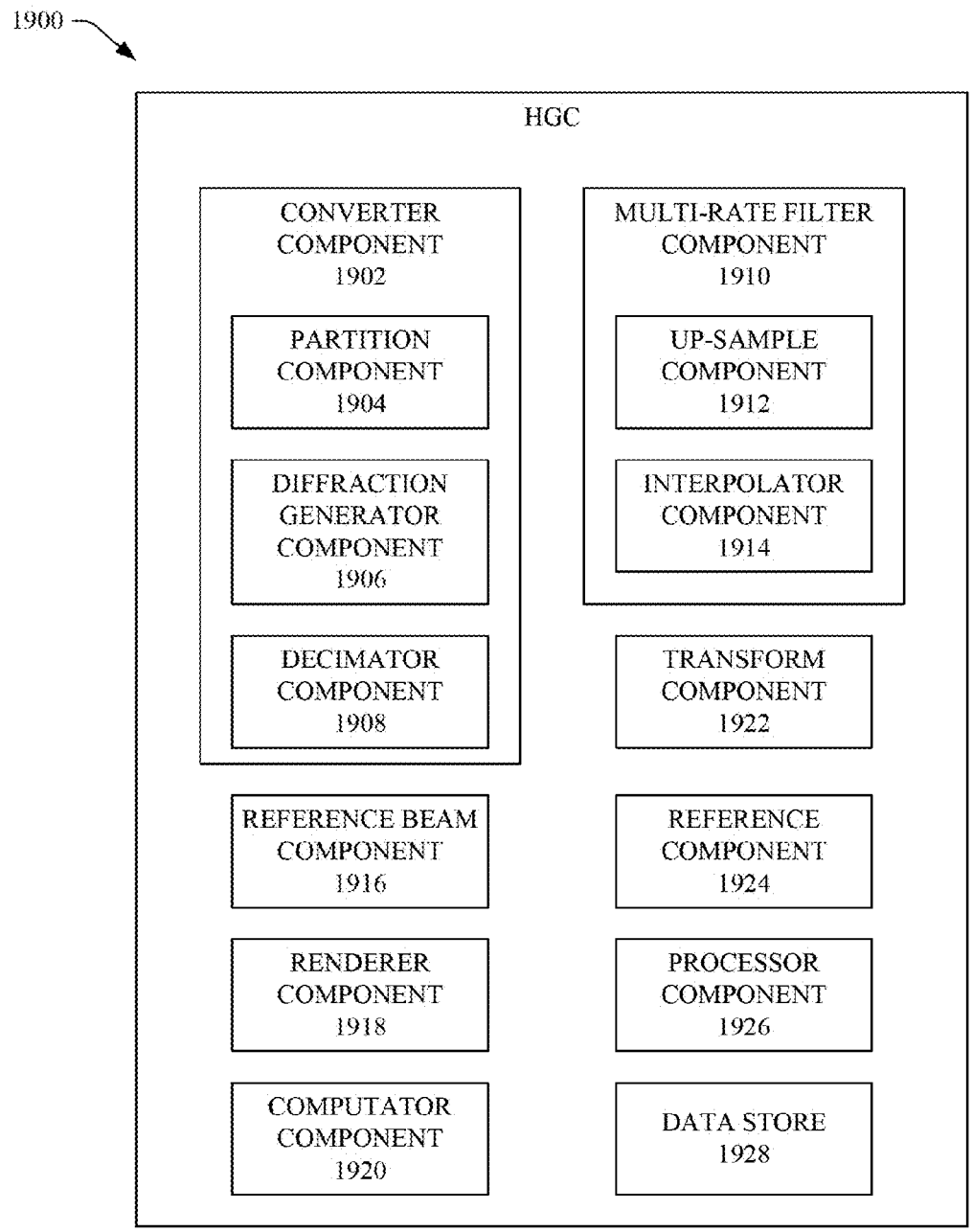
FIG. 19 illustrates a diagram of an example hologram generation component 1900 in accordance with various aspects and embodiments of the disclosed subject matter.

In accordance with various aspects, the interpolation performed by the interpolation filter component 904 can be conducted in either the spatial domain (e.g., employing a convolution process) or frequency domain (e.g., employing fast Fourier transforms (FFTs) and/or a GPU), resulting in a multi-rate filtering process to facilitate generation of the Fresnel hologram of a 3-D object scene. For instance, in an embodiment, the disclosed subject matter can employ FFT to deduce the output of the interpolation filter component 904, as opposed to only applying convolution in a straightforward manner. The disclosed subject matter can thereby result in significant savings in the computational loading, and the amount of reduction in the computational loading can increase significantly with the increase in size of the hologram and the number of object points. Further, in another aspect, the transfer function of the interpolation filter component 904 and the frequency spectrum of the reference wave can be integrated into a single entity, which can be pre-computed in advance and stored in a reference table(s) in a data store (not shown in FIG. 9; as shown in FIG. 19), wherein interpolation-related information stored in the reference table(s) can be referenced (e.g., looked-up) in the reference table(s) during hologram generation to save time and reduce the amount of computational operations needed to generate the hologram. The interpolation process can thereby not impose any additional computations in the generation of the full hologram.

In an aspect, taking the impulse response g(y) 906 of the interpolation filter component 904 into account, Eq. (9) can be rewritten as $$D(x,y)=[O(x,y/M)*g(y)]*B(y)=O'(x,y)*B(y) \quad (10)$$

where O'(x, y)=O(x, y/M)*g(y).

In yet another aspect, the multi-rate filter component 106 can perform a convolution process on O'(x, y) using the function B(y) 908 to produce the desired diffraction pattern D(x, y) as an output. For example, in accordance with Eq. (10), the multi-rate filter component 106 can determine or calculate D(x, y)=O'(x, y)*B(y), wherein * in Eq. (10) denotes a convolution operation along the y direction.

In still another aspect, the HGC 102 can interfere the diffraction pattern D(x, y) with an off-axis plane reference beam R(y) to generate the off-axis Fresnel hologram H(x, y) as $$H(x,y)=D(x,y)R(y) \text{ or alternatively } H(x,y)=D(x,y)R^*(y) \quad (11)$$

To produce the hologram on devices which only present amplitude information, such as photographic film, the HGC 102 can retain the real part of the hologram as $$H_R(x,y)=Re[D(x,y)R(y)] \text{ or alternatively } H_R(x,y)=Re[D(x,y)R^*(y)] \quad (12)$$

wherein $H_R(x, y)$ is the real portion of the hologram H(x, y).

It is noted that direct calculation of D(x, y) based on Eq. (12) can be computationally intensive. In an aspect, to overcome this potential problem, the multi-rate filter component 106 can perform the process for generating or obtaining the hologram in the frequency domain. Letting $\tilde{D}(x, e^{j\omega})$, $\tilde{O}(x, e^{j\omega})$, and $\tilde{B}(e^{j\omega})$ denote the Fourier transforms of the diffraction pattern D(x, y), the stack of sub-lines O(x, y) (or alternatively O'(x, y), and the function B(y), respectively, we have $$\tilde{D}(x,e^{j\omega})=\tilde{O}(x,e^{jM\omega})\tilde{B}(e^{j\omega}) \quad (13)$$

The multi-rate filter component 106 can facilitate obtaining or generating the 3-D hologram of the 3-D object scene by performing an inverse Fourier transformation $\tilde{D}(x, e^{j\omega})$, followed by the HGC 102 interfering with the diffraction pattern using the reference beam R(y). For example, the HGC 102, employing the multi-rate filter component 106, can obtain the 3-D Fresnel hologram by performing an inverse Fourier transformation $\tilde{D}(x, e^{j\omega})$, followed by interference with the reference beam R(y) as $$H(x,y)=R(y) \times FT^{-1}\{\tilde{O}(x,e^{jM\omega})\tilde{B}(e^{j\omega})\} \quad (14)$$

where $FT^{-1}\{\text{"function(s)-to-be-transformed"}\}$ denotes the inverse Fourier transform operation on the functions within the brackets, and H(x, y) is the hologram that can be output for display.

In accordance with an alternative embodiment, the multi-rate filtering process performed on the information (e.g., sub-lines) relating to or representative of the 3-D object scene and generation of the hologram (e.g., Fresnel hologram) of the 3-D object scene can be described as follows. As disclosed, the sub-lines associated with a 3-D object scene can be generated with throughput of 100 megapixels per second by employing an economical hardware solution. Hence the computation loading in this process can be neglected. However, direct rendering of the diffraction pattern D(x, y) based on Eq. (11) can still be undesirably computationally intensive. In an aspect, to overcome this potential problem of undesirable computation-intensive direct rendering of the diffraction pattern, the multi-rate filter component 106 can perform the direct rendering process in the frequency domain. Since y takes on the values of a sequence of real numbers, which corresponds to the different "discretely distributed" sub-lines, we can employ the z-transform along y. Hence, taking the z transform of Eq. (10) gives $$\tilde{D}(x,z) = \tilde{O}(x,z)\tilde{B}(z) = \tilde{O}(x,z^M)G(z)\tilde{B}(z) = \tilde{O}(x,z^M)E(z) \quad (15)$$

where $\tilde{D}(x, z)$, $\tilde{O}(x, z^M)$ are the z transforms of the diffraction pattern D(x, y) and the interpolated stack of sub-lines O(x, y/M), and $E(z) = G(z)\tilde{R}^*(z)$. Substituting $z = e^{i\omega}$, Eq. (15) becomes $$\tilde{D}(x,e^{i\omega}) = \tilde{O}(x,e^{iM\omega})G(e^{i\omega})R^*(e^{i\omega}) = \tilde{O}(x,e^{i\omega})E(e^{i\omega}) \quad (16)$$

$G(e^{i\omega})$ is basically a low-pass response that can be employed by the multi-rate filter component 106 to interpolate and suppress the empty spacing between consecutive sub-lines due to decimation to remove sub-lines and subsequent up-sampling of the subset of sub-lines to insert empty gaps (e.g., empty sub-lines) between adjacent remaining sub-lines. In an aspect, the multi-rate filter component 106 can employ a Hamming filter with a unit impulse response g(y) given by $$g(y) = 0.54 + 0.46\cos\left(\frac{2\pi y}{len}\right) \quad (17)$$

wherein len is the tap length of the filter which can be varied to tradeoff between the continuity and resolution of the reconstructed holographic image along they direction.

In Eq. (16), $\tilde{D}(x, e^{i\omega})$, $\tilde{O}(x, e^{iM\omega})$, and $E(e^{i\omega})$ can represent the Fourier transform FT{"function(s)-to-be-transformed"} of the diffraction pattern D(x, y), the stack of sub-lines O(x, y/M), and the function E(y), respectively. Since O(x, y/M) is the interpolation of O(x, y), their Fourier transforms are similar and only differ by a scaling in the frequency axis. In another words $\tilde{O}(x, e^{iM\omega})$ can be deduced directly from $\tilde{O}(x, e^{i\omega})$. The diffraction pattern can be obtained from the inverse of $\tilde{D}(x, e^{i\omega})$ as $$D(x,y) = FT^{-1}[\tilde{D}(x,e^{i\omega})] = FT^{-1}[\tilde{O}(x,e^{iM\omega})E(e^{i\omega})] \quad (18)$$

where $FT^{-1}\{$"function(s)-to-be-transformed"$\}$ denotes the inverse Fourier transform operation. Since $E(e^{i\omega})$ can be pre-computed in advance (and, for example, stored in and retrieved from a reference table), to derive D(x, y) it is only necessary to determine the Fourier transform of O(x, y), the product of $\tilde{O}(x, e^{iM\omega})$ and $E(e^{i\omega})$, and the inverse Fourier transforms of $\tilde{D}(x, e^{i\omega})$. Employing fast Fourier transform (FFT), the number of complex multiplications involved in each of the above acts (e.g., calculations, transforms, etc.) for a diffraction pattern of size X×Y is listed in Table I. For instance, the transform of O(x, y) to Õ(x, y), denoted by O(x, y)→Õ(x, $e^{iM\omega}$) in the left column in the table, takes X×Y/M log$_2$ (Y/M) number of complex multiplications. The number of operations that are performed to generate the sub-lines is omitted here as that process can be realized using conventional techniques.

TABLE I

A breakdown of number of complex multiplications for each step in Eq. (18)

| Operation | Number of Complex Multiplications |
|---|---|
| O(x,y) → Õ(x,$e^{iM\omega}$) | X × Y/M log$_2$(Y/M) |
| Õ(x,$e^{iM\omega}$)E($e^{i\omega}$) | X × Y |
| $\tilde{D}$(x,$e^{i\omega}$)→ D(x,y) | X × Y log$_2$(Y) |

It is noted that $\tilde{O}(x, e^{iM\omega})$ can be obtained by scaling the frequency axis of the Fourier transform of O(x, y). As the latter is 1/M of the length of O'(x, y), the number of arithmetic operations is reduced as compared with direct application of FFT on O'(x, y).

To complete the hologram, the diffraction pattern can be interfered with an off-axis reference beam R(y), for example, in accordance with Eq. (11), which is a point-by-point operation involving an additional (X×Y) operations. The total number of complex multiplications to render a hologram H(x, y) of a 3-D object scene, according to Eq. (18) and Table I, is therefore $$X \times Y\left[1 + \log_2 Y + \frac{1}{M}\log_2(Y/M)\right] + X \times Y = \quad (19)$$

$$X \times Y\left[2 + \log_2 Y + \frac{1}{M}\log_2(Y/M)\right]$$

It is noted that a complex multiplication involves four multiplication operations. Comparing with straightforward generation of the Fresnel hologram based on the look-up table approach, and assuming no decimation on the scan-planes (e.g., M=1) in employing the disclosed hologram generation techniques, the amount of computation can be reduced by a factor of $$\frac{2 \times X \times Y \times N_P}{4\{X \times Y[2 + \log_2 Y + \log_2(Y)]\}} = \frac{N_P}{4[1 + \log_2(Y)]} \quad (20)$$

as compared with the classical straightforward calculation of the Fresnel hologram.

In accordance with still another aspect, the HGC 102 can be associated with a display component 108 that can receive the hologram output (e.g., H(x, y) or H$_R$(x, y)) from the HGC 102 and can display the hologram so that it is perceivable by (e.g., visible to) users utilizing or observing the display component 108. In accordance with various embodiments, the display component 108 can comprise one or more of a LCOS display, a LCD (e.g., high resolution LCD), an autostereoscopic display (e.g., a multiple-section autostereoscopic display (MSAD)), a holographic 3-D television (TV) display, a SLM, or other desired display suitable for displaying holograms, to facilitate real time display of the hologram (e.g., 2-D or 3-D Fresnel hologram). Additionally and/or alternatively, if desired, the hologram can be produced onto a desired material (e.g., onto film using photographic techniques) so that there is a hard copy of the hologram that can be used to reproduce the hologram at a desired time. Also, it is to be appreciated and understood that the hologram output can be communicated over wired or wireless communication channels to the display component 108 or other display components (e.g., remote display components, such as a 3-D TV display) to facilitate generation and display of the hologram of the 3-D object scene) so that the hologram can be presented to desired observers.

It has been shown that the sub-lines O(x, y) can be generated with throughput of 100 megapixels per second with an economical hardware solution. Hence the majority of computation is spent in the forward and inverse Fourier transform operations. In an embodiment, to improve the speed of these pair of processes, the HGC 102 can comprise a desired GPU, which can apply a Compute Unified Device Architecture (CUDA), which is an engine in the GPU. The amount of time taken to generate Fresnel holograms of various sizes using a Nvidia GeForce GTX260+ as the GPU are listed in Table II. It can be seen that the speed of computation is close to the requirement of a real time video holographic system. It is to be appreciated and understood, that, in accordance with other embodiments, other types of GPUs and/or engines other than CUDA (e.g., GPU with a parallel computing architecture) can be employed, in accordance with the disclosed subject matter, to facilitate fast generation of Fresnel holograms of 3-D object scenes.

TABLE II

Computation time in hologram generation from sub-lines based on the GPU
CPU: Intel Q6600 @ 2.40 GHz
GPU: Nvidia Geforce GTX260+

| Hologram size | Number of object points ($10^3$) | GPU Computation time (sec) |
|---|---|---|
| 1024 × 1024 | 1000 | 0.03 |
| 2048 × 2048 | 4000 | 0.18 |
| 4096 × 4096 | 16000 | 0.78 |

Figure 10:
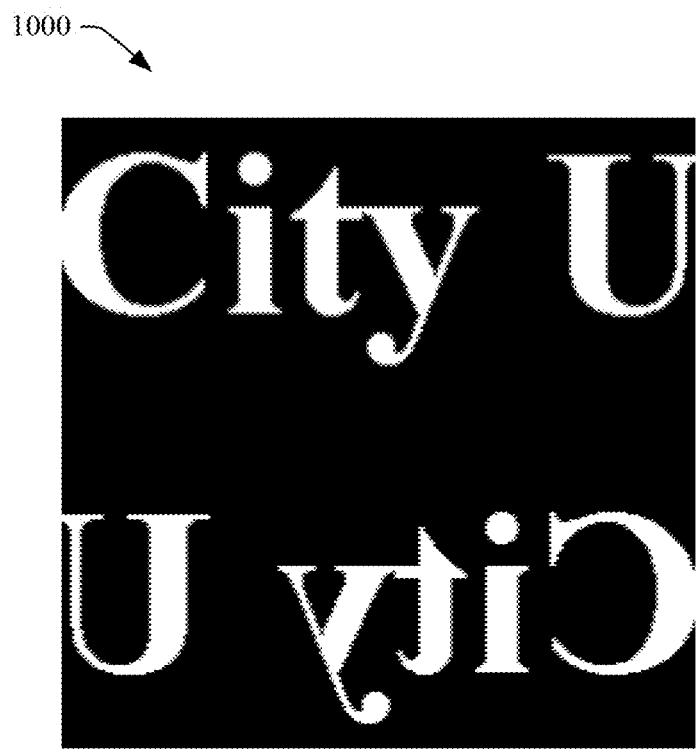
FIG. 10 depicts an example image to illustrate aspects of the disclosed hologram generation techniques.
Figure 11:
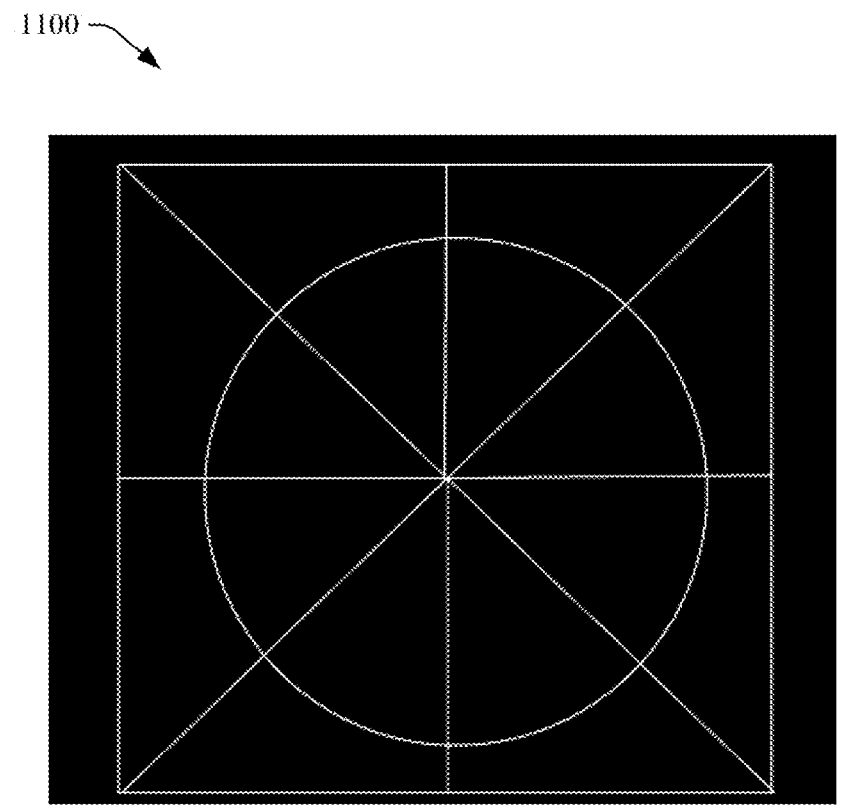
FIG. 11 illustrates another example image to illustrate aspects of the disclosed hologram generation techniques.

FIGS. 10 and 11 depict example images 1000 and 1100, respectively, to illustrate aspects of the disclosed hologram generation techniques. As shown in FIGS. 10 and 11, the image 1000 is "CityU" and the image 1100 is "Star". For each of image 1000 and image 1100, the diffraction pattern is calculated with Eq. (18) and beat or interfered with a reference beam to obtain the hologram. For each of image 1000 and image 1100, the size of the image and its corresponding diffraction pattern and hologram is identical. Due to the constraint of the printing device, the real part of the holograms are binarized and printed with the "CreoScitex Dolev 800 V2" printer in the form of black and white fringe patterns on Agfa Red Sensitive film. Certain particular parameters involved in the hologram generation process are listed in Table III.

TABLE III

Setting for generating the sub-lines and hologram

| Wavelength | 650 nm | Image/Hologram dimension of "CityU" | X = Y = 1024 |
|---|---|---|---|
| Pixel size of hologram | 10.58 um × 10.58 um | Image/Hologram dimension of "Star" | X = Y = 2048 |
| Distance of object plane from hologram | 40 cm | Illumination angle of reference beam ($\theta_{ill}$) | 1.2 degree |

Figure 12:
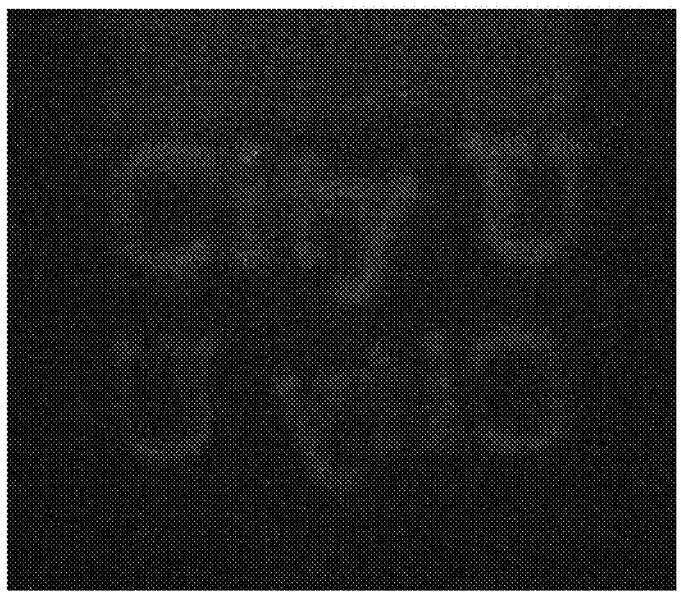
FIG. 12 depicts a reconstructed holographic image of the image in FIG. 10.
Figure 13:
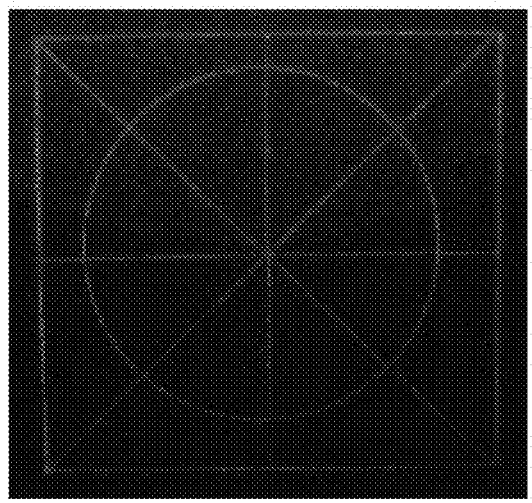
FIG. 13 illustrates a reconstructed holographic image of the image in FIG. 11.

FIG. 12 depicts a reconstructed holographic image 1200 of the image 1000 in FIG. 10, and FIG. 13 depicts a reconstructed holographic image 1300 of the image 1100 in FIG. 11. It can be seen in FIGS. 12 and 13 that, apart from a partial overlapping with the zero order beam, the holographic images 1200 and 1300 are very close to the respective original images 1000 and 1100.

Figure 14:
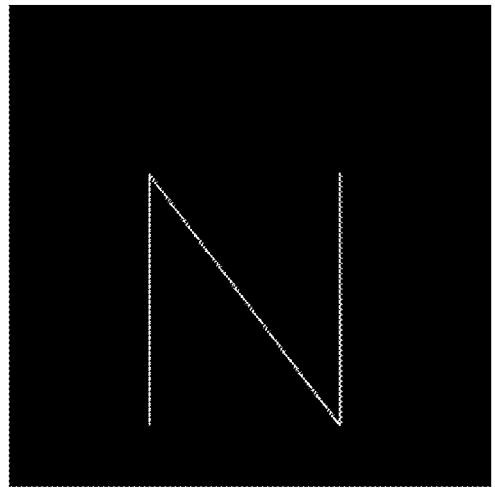
FIG. 14 illustrates an example image of a 3-D object scene.
Figure 15:
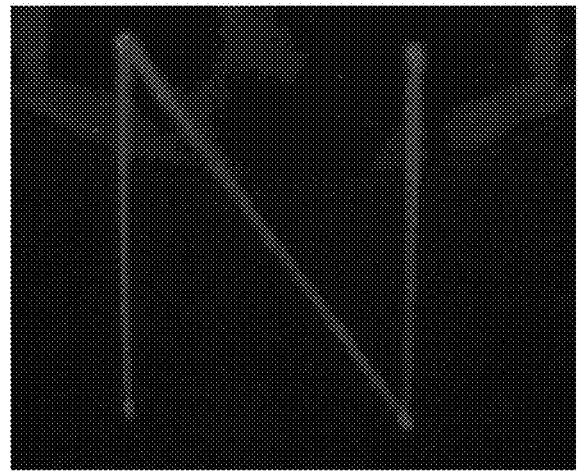
FIG. 15 depicts an example reconstructed image of the original image of FIG. 14 before applying down-sampling to the subset of sub-lines.
Figure 16:
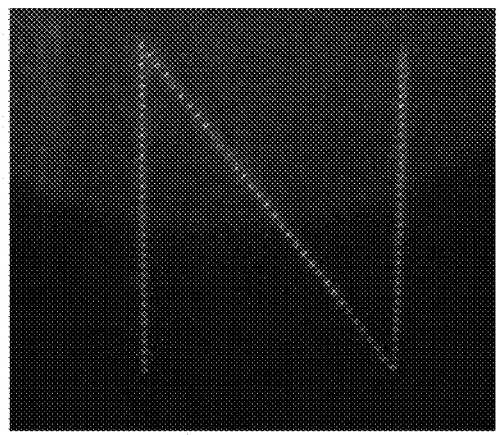
FIG. 16 illustrates an example reconstructed image of the original image after applying a specified down-sampling factor on the subset of sub-lines associated with the 3-D object scene.
Figure 17:
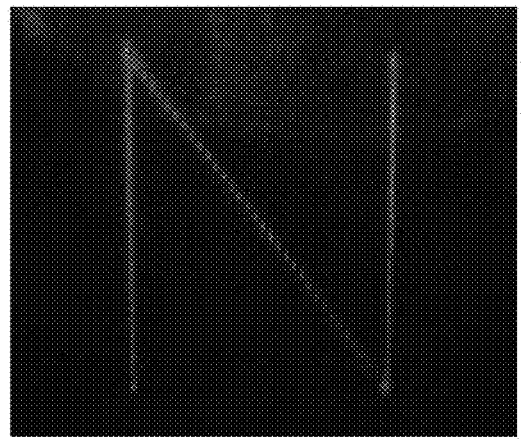
FIG. 17 illustrates an example reconstructed image of the original image after applying interpolation to suppress empty gaps associated with the sub-lines.

FIGS. 14-17 illustrate an example effect of down-sampling (or decimation) and interpolation on the sub-lines of an example 3-D object scene. FIG. 14 illustrates an example image 1400 of a 3-D object scene. The image 1400 is converted into sub-lines and expanded to 2-D diffraction pattern and hologram based at least in part on Eqs. (18) and (12), respectively. FIG. 15 depicts an example reconstructed image 1500 of the original image 1400 before applying down-sampling to the subset of sub-lines. FIG. 16 illustrates an example reconstructed image 1600 of the original image 1400 after applying a down-sampling factor of 16 on the subset of sub-lines associated with the 3-D object scene. It can be seen that, as a result of down-sampling, the continuity of all the lines in the image 1600 are disrupted. Due to the limitation in resolution of the printing device and the camera which imposes a low-pass effect on the reconstructed images (e.g., image 1600), the discontinuity appears to be less severe. FIG. 17 illustrates an example reconstructed holographic image 1700 of the original image (e.g., image 1400) after applying interpolation to suppress empty gaps associated with the sub-lines, wherein, after the interpolation is performed, the discontinuity of the vertical lines are removed, as shown in FIG. 17. It is noted, however, the interpolation is not applicable to the slant line as there is no adjacent pixel along the vertical direction for those sampled points.

Figure 18:
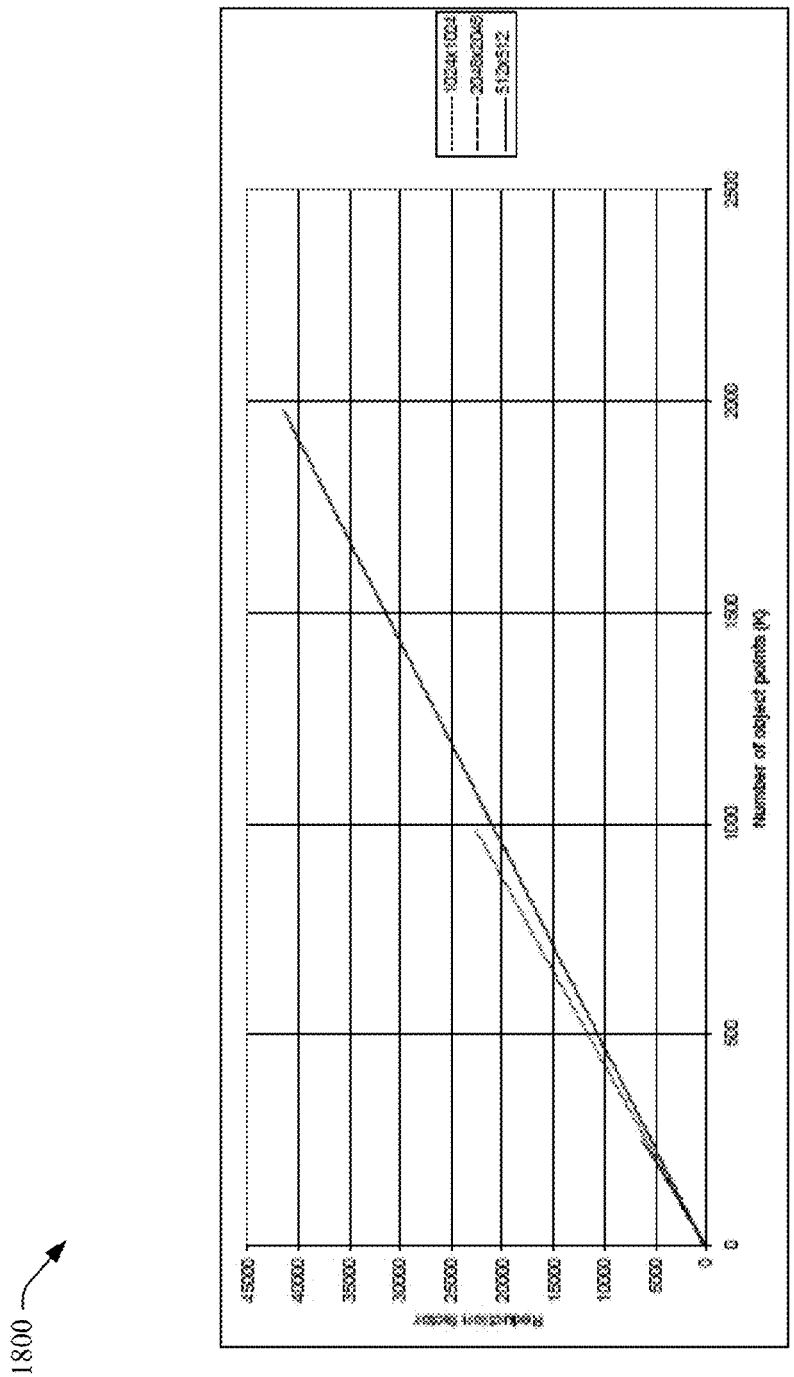
FIG. 18 depicts an example graph showing the reduction factor versus number of object points in relation to hologram generation in accordance with various aspects and embodiments of the disclosed subject matter.

FIG. 18 depicts an example graph 1800 showing the reduction factor versus number of object points associated with an example 3-D object scene in relation to hologram generation in accordance with various aspects and embodiments of the disclosed subject matter. In graph 1800, the reduction factor versus the number of object points is computed based on Eq. (20), respectively, for hologram sizes of 512×512, 1024×1024, and 2048×2048. For all of these three cases, the image and hologram size are identical, and hence the number of object points is less than or equal to that of the hologram. In graph 1800, it can be seen that the reduction factor is almost linearly proportional to the number of object points. Employing the disclosed hologram generation techniques, for a moderate hologram size of 2048×2048, the reduction factor can be as high as (or even greater than) 40,000 times.

For the three test images (e.g., image 1000, image 1100, image 1400, respectively) shown in FIGS. 10, 11, and 14, the number of object points and reduction factors are listed in Table IV.

TABLE IV

Reduction factors for the test images in FIGS. 10, 11, and 14

| Test image | FIG. | Object points | Reduction factor |
|---|---|---|---|
| CityU | 10 | 40220 | 914 |
| Star | 11 | 30597 | 637 |
| N | 14 | 26934 | 561 |

The various embodiments of the subject disclosure can be employed for numerous applications, which can include, for example, live hologram presentations, 3-D movie viewing, advertisements, video games, and scientific research, among other types of applications. Further, one or more embodiments, with the advancement of the technology, as desired, can be realized with available electronics and computing resources, and moderate changes in the existing video framework. As a result, such embodiments are economical and can be easily utilized by movie producers, graphic designers, and content providers in general.

FIG. 19 illustrates a diagram of an example HGC 1900 in accordance with various aspects and embodiments of the disclosed subject matter. In an aspect, the HGC 1900 can include a converter component 1902 that can be employed to generate a diffraction pattern representative of a 3-D object scene, as more fully disclosed herein. The converter component 1902 can include a partition component 1904 that can be employed to partition or segment (e.g., uniformly segment) a 3-D object scene (e.g., real or computer synthesized) into a vertical stack of scan planes, wherein the line with the same vertical height of the scan plane can be taken into account and can be a sub-line associated with that scan plane. Thus, the vertical stack of scan planes can respectively contain a corresponding number of sub-lines (e.g., a sequence of sub-lines). Each sub-line of the sub-line sequence can contain a diffraction pattern representative of the 3-D object scene (e.g., representative of a corresponding portion of the 3-D object scene).

In an aspect, the converter component 1902 also can include a diffraction pattern generator component 1906 that can generate diffraction patterns associated with the respective scan lines of the sub-line sequence, and the diffraction pattern from all of the scan planes by integrating the individual contributions of the diffraction patterns of the sub-lines, as more fully disclosed herein. In an aspect, the diffraction generator component 1906 also can facilitate performing convolution operations on the sub-line sequence to facilitate generating the diffraction pattern that can be used to reconstruct holographic images of the 3-D object scene.

In another aspect, the converter component 1902 can comprise a decimator component 1908 that can be employed to decimate or down-sample a sequence of sub-lines associated with a 3-D object scene to facilitate reducing the data rate associated with reconstruction or reproduction of the 3-D object scene as a hologram (e.g., series of holographic images). The decimator component 1908 can decimate or down-sample the sub-line sequence by a desired factor, which can be predefined or determined dynamically based at least in part on the object scene to be reconstructed as a hologram, the number of sub-lines in the sequence, or other desired decimation criteria.

In still another aspect, the HGC 1900 can include a multi-rate filter component 1910 that can perform a desired multi-rate filter process on the sub-line sequence (e.g., decimated sub-line sequence) to facilitate efficient generation of a hologram of the 3-D object scene. The multi-rate filter component 1910 can contain an up-sample component 1912 that can up-sample the sub-line sequence (e.g., as decimated) by a desired factor (e.g., a factor that corresponds to the factor employed to decimate the sub-line sequence) so that the sampling rate between the sub-lines O(x, y) and the function B(y) can be the same in order to allow the HGC 1900 to be able to perform the desired convolution operations to facilitate generating the diffraction pattern and thereby the hologram of the 3-D object scene. The up-sampling of the sub-line sequence can insert or introduce a specified number of empty gaps or empty sub-lines into the sub-line sequence, wherein the number of empty gaps or empty sub-lines can be determined as a function of the factor employed for up-sampling (or down-sampling) of the sub-line sequence.

In yet another aspect, the multi-rate filter component 1910 can comprise an interpolator component 1914 that can employ a desired filter(s) (e.g., interpolation filter) to the sub-line sequence (e.g., as up-sampled after decimation) to suppress all or at least a portion of empty gaps or empty sub-lines in the sub-line sequence to improve reconstruction (e.g., to minimize degradation of the visual quality) of the hologram while also providing computational efficiency in the reconstruction of the hologram advantageously over conventional hologram generation techniques.

In another aspect, the HGC 1900 also can include a reference beam component 1916 that can apply a desired reference beam (e.g., off-axis plane reference beam) to (e.g., interfere the desired reference beam with) the diffraction pattern to facilitate generating the hologram of the 3-D object scene associated with the diffraction pattern. In still another aspect, the HGC 1900 can comprise a renderer component 1918 that can convert the data (e.g., model data or diffraction pattern data) associated with the 3-D object scene into corresponding holographic data, which can be used to generate a hologram that is a reproduction of the 3-D object scene and is representative of different visual perspectives of the 3-D object scene. Alternatively or additionally, the renderer component 1918 can generate holographic data based at least in part on the respective visual information from the different visual perspectives of the 3-D object scene to facilitate producing a hologram representative of the 3-D object scene.

In still another aspect, the HGC 1900 can include a computator component 1920 that can perform desired computation operations on data associated with generation of the hologram of a 3-D object scene. The computator component 1920 can perform addition, subtraction, multiplication, complex multiplication, division, exponential operations, logarithmic operations, etc., on the data relating to hologram generation when desired.

In yet another aspect, the HGC 1900 also can contain a transform component 1922 that can perform desired transformations on data relating to generation of a hologram of a 3-D object scene. For instance, at desired times during the hologram generation process, the transform component 1922 can perform a z-transform, a FFT, and/or an inverse FFT of the diffraction pattern, the sub-lines, and function associated with generation of the diffraction pattern.

In an aspect, the HGC 1900 can comprise a reference component 1924 that can include one or more reference tables (e.g., look-up tables) that can contain information, such as pre-computed data relating to generation of the hologram. For example, a reference table can comprise pre-computed data relating to the transfer function of the interpolation filter and the frequency spectrum of the reference wave, which can be integrated as a single entity in the reference table, as desired. The one or more reference tables can be stored in the data store 1928.

The HGC 1900 also can comprise a processor component 1926 that can work in conjunction with the other components (e.g., a converter component 1902, a partition component 1904, a diffraction generator component 1906, a decimator component 1908, a multi-rate filter component 1910, an up-sample component 1912, an interpolator component 1914, a reference beam component 1916, a renderer component 1918, a computator component 1920, a transform component 1922, a reference component 1924, etc.) to facilitate performing the various functions of the HGC 1900. The processor component 1926 can employ one or more processors, microprocessors, or controllers that can process data, such as information (e.g., visual information) relating to a 3-D object scene, information relating to sub-lines or diffraction patterns, holographic data, data relating to parameters associated with the HGC 1900 and associated components, etc., to facilitate generating and displaying holographic images (e.g., 2-D or 3-D Fresnel hologram) representative of a 3-D object scene; and can control data flow between the HGC 1900 and other components associated with the HGC 1900.

In yet another aspect, the HGC 1900 can contain a data store 1928 that can store data structures (e.g., user data, metadata); code structure(s) (e.g., modules, objects, classes, procedures), commands, or instructions; information relating to (e.g., representative of) a 3-D object scene; information relating to sub-lines or diffraction patterns; holographic data; reference data stored in reference tables; parameter data; and so on. In an aspect, the processor component 1926 can be functionally coupled (e.g., through a memory bus) to the data store 1928 in order to store and retrieve information desired to operate and/or confer functionality, at least in part, to the converter component 1902, partition component 1904, diffraction generator component 1906, decimator component 1908, multi-rate filter component 1910, up-sample component 1912, interpolator component 1914, reference beam component 1916, renderer component 1918, computator component 1920, transform component 1922, reference component 1924, and/or substantially any other operational aspects of the HGC 1900. It is to be appreciated and understood that the various components of the HGC 1900 can communicate information between each other and/or between other components associated with the HGC 1900 as desired to carry out operations of the HGC 1900. It is to be further appreciated and understood that the converter component 1902, partition component 1904, diffraction generator component 1906, decimator component 1908, multi-rate filter component 1910, up-sample component 1912, interpolator component 1914, reference beam component 1916, renderer component 1918, computator component 1920, transform component 1922, reference component 1924, processor component 1926, and data store 1928 each can be a stand-alone unit, can be included within the HGC 1900 (as depicted), can be incorporated within another component, and/or virtually any suitable combination thereof, as desired.

It is to be appreciated and understood that, in accordance with various other aspects and embodiments, the HGC 1900 or components associated therewith can include other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reflector component(s) (e.g., to reflect holographic images to facilitate display of the hologram), and/or display partitions (e.g., to partition a display into a desired number of partitions in order to show different views of the hologram), etc., that can be employed to facilitate generating and/or displaying a hologram of a 3-D object scene.

Figure 20:
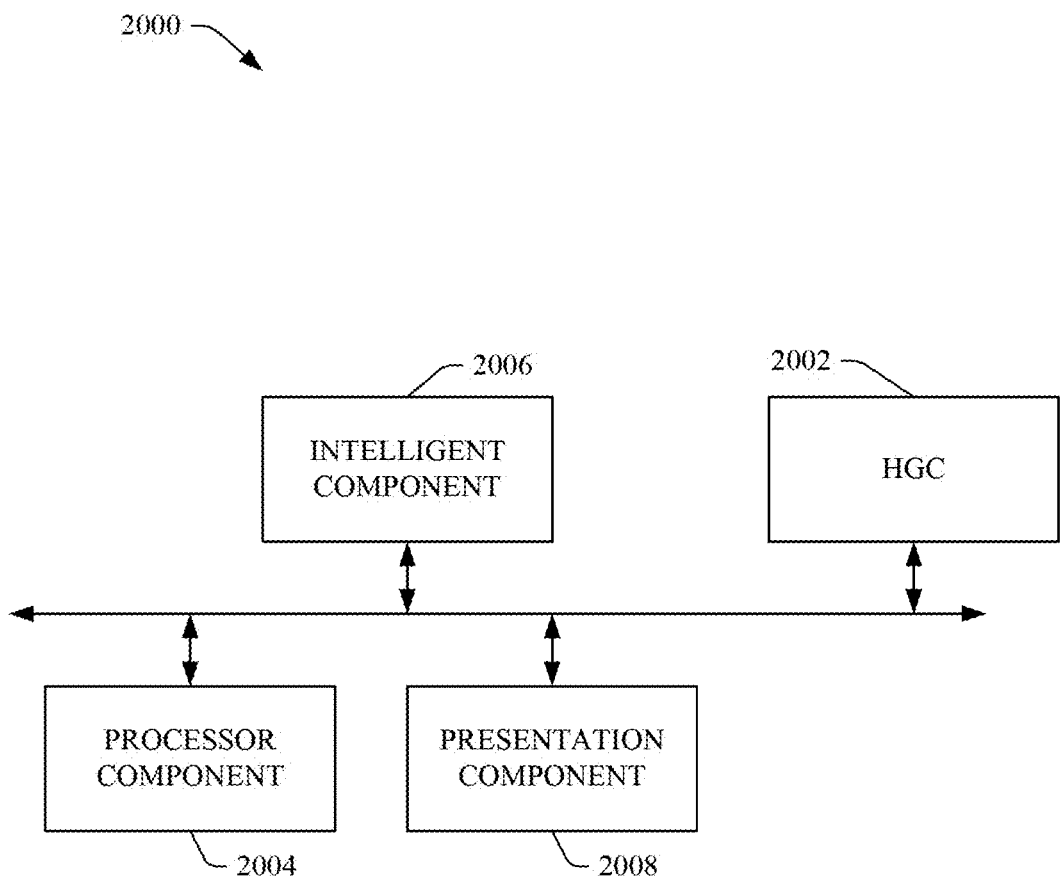
FIG. 20 depicts a block diagram of a system that can employ intelligence to facilitate generation and display of holograms of a 3-D object scene in accordance with an embodiment of the disclosed subject matter.

Referring to FIG. 20, depicted is a block diagram of a system 2000 that can employ intelligence to facilitate generation and display of holograms of a 3-D object scene in accordance with an embodiment of the disclosed subject matter. System 2000 can include a HGC 2002 that can be employed to generate holograms (e.g., Fresnel holograms) of 3-D object scenes, as more fully disclosed herein. It is to be appreciated that the HGC 2002 can be the same or similar as respective components (e.g., respectively named components), and/or can contain the same or similar functionality as respective components, as more fully described herein.

The system 2000 can further include a processor component 2004 that can be associated with the HGC 2002 and/or other components (e.g., components of system 2000) via a bus. In accordance with an embodiment of the disclosed subject matter, the processor component 2004 can be an applications processor(s) that can run applications and manage communications. For example, the processor component 2004 can be a processor that can be utilized by a computer, mobile computing device, or other electronic device. In an embodiment, the processor component 2004 can comprise one or more GPUs to facilitate efficient real-time generation of holograms from 3-D object scenes. The processor component 2004 can generate commands in order to facilitate generating and displaying a 3-D hologram of the 3-D object scene, modifying parameters associated with the HGC 2002, etc.

The system 2000 also can include an intelligent component 2006 that can be associated with the HGC 2002, the processor component 2004, and/or other components associated with system 2000 to facilitate analyzing data, such as current and/or historical information, and, based at least in part on such information, can make an inference(s) and/or a determination(s) regarding, for example, generation of a 3-D hologram based at least in part on a 3-D object scene, setting of parameters associated with the HGC 2002 and/or associated components, etc.

For example, based in part on current and/or historical evidence, the intelligent component 2006 can infer a 3-D hologram of a 3-D object scene be modified to facilitate improving or enhancing display of the 3-D hologram, one or more parameter settings associated with the HGC 2002 and/or an associated display component be adjusted to facilitate improving or enhancing display of the 3-D hologram, a decimation factor to be employed in decimation a sequence of sub-lines associated with a 3-D object scene, whether the multi-rate filtering process is to be conducted in the spatial domain or frequency domain, etc. The intelligent component 2006 can communicate information related to the inferences and/or determinations to the HGC 2002. Based at least in part on the inference with respect to such data by the intelligent component 2006, the HGC 2002 can take or perform (e.g., automatically or dynamically perform) one or more actions (e.g., selection of a parameter setting, selection of a decimation factor, selection of the spatial domain or frequency domain for the multi-rate filtering process, etc.) to facilitate desirably generating and displaying a hologram (e.g., 3-D Fresnel hologram) of the 3-D object scene.

It is to be understood that the intelligent component 2006 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 2000 also can include a presentation component 2008, which can be connected with the processor component 2004. The presentation component 2008 can provide various types of user interfaces to facilitate interaction between a user and any component coupled to the processor component 2004. As depicted, the presentation component 2008 is a separate entity that can be utilized with the processor component 2004 and associated components. However, it is to be appreciated that the presentation component 2008 and/or similar view components can be incorporated into the processor component 2004 and/or a stand-alone unit. The presentation component 2008 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 2004.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 2002 and/or other components, can be situated or implemented on a single integrated-circuit chip. In accordance with another embodiment, the HGC 2002, and/or other components, can be implemented on an application-specific integrated-circuit (ASIC) chip. In yet another embodiment, the HGC 2002 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 21:
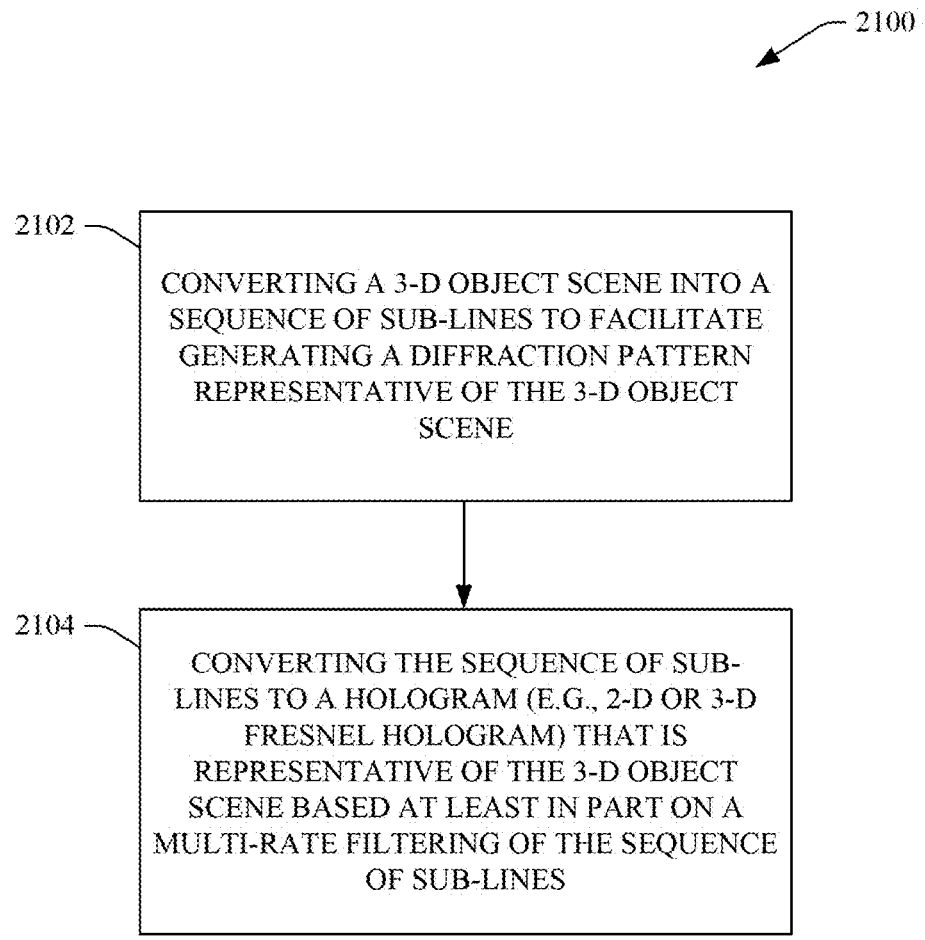
FIG. 21 depicts a flow diagram of an example method that can employ a multi-rate filter process to generate a hologram of a 3-D object scene in accordance with various embodiments and aspects of the disclosed subject matter is illustrated.
Figure 22:
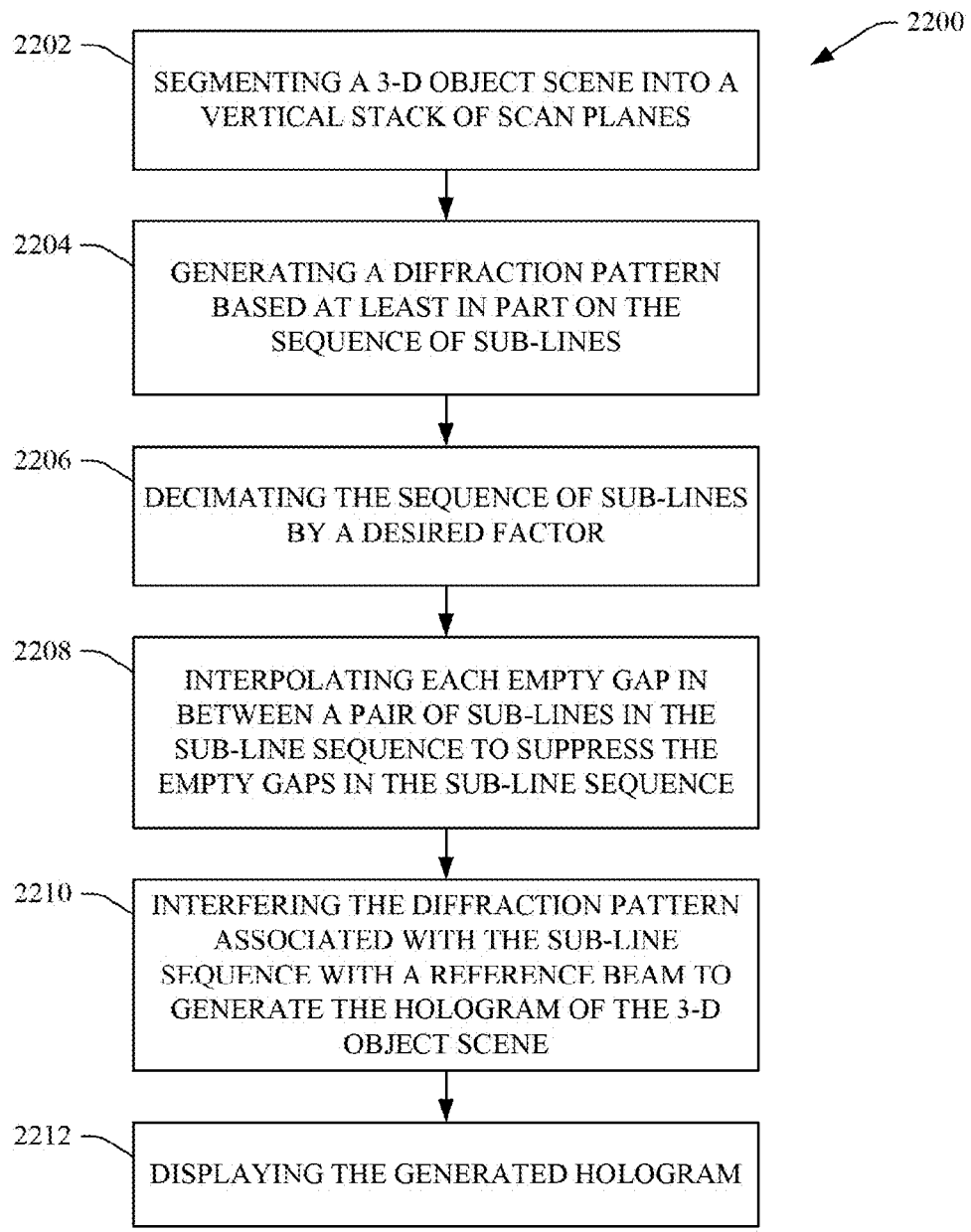
FIG. 22 illustrates a flow diagram of an example method that can employ a multi-rate filter process to generate a hologram of a 3-D object scene in accordance with various aspects and embodiments of the disclosed subject matter.
Figure 23:
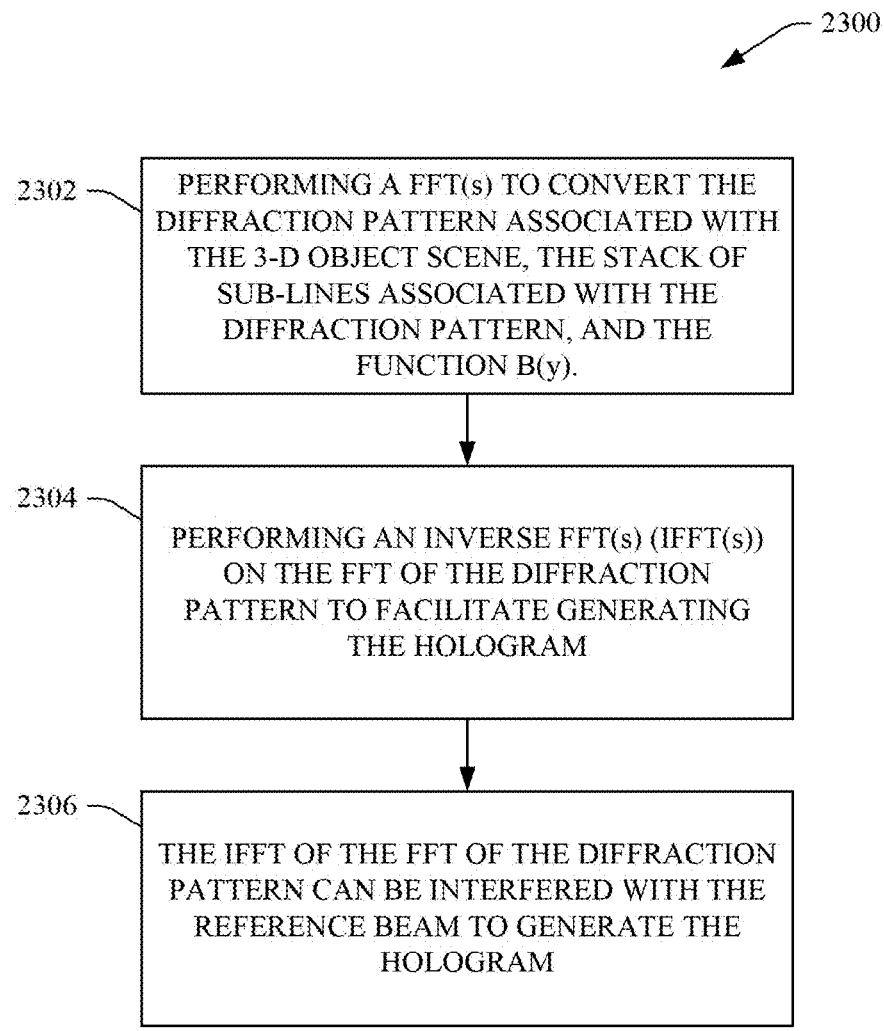
FIG. 23 depicts a flow diagram of an example method that can employ a fast Fourier transform(s) (FFT(s)) to facilitate generating a hologram of a 3-D object scene in accordance with various aspects and embodiments of the disclosed subject matter.

FIGS. 21-23 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 21, a flow diagram of an example method 2100 that can employ a multi-rate filter process to generate a hologram (e.g., Fresnel hologram) of a 3-D object scene in accordance with various embodiments and aspects of the disclosed subject matter is illustrated. At 2102, a 3-D object scene can be converted into a sequence of sub-lines to facilitate generating a diffraction pattern representative of the 3-D object scene. The 3-D object scene can be uniformly segmented into a vertical stack of scan planes, wherein each of the sub-lines can be respectively associated with a scan plane. The diffraction pattern from all of the scan planes can be obtained from integrating the individual diffraction pattern contributions associated with each scan plane. For instance, the diffraction pattern can be determined employing a convolution process, wherein the diffraction pattern $D(x, y)$ can be obtained, for example, as $D(x, y)=O(x, y)*B(y)$, as more fully disclosed herein, wherein * denotes a convolution operation along the y direction.

At 2104, the sequence of sub-lines can be converted to a hologram (e.g., 2-D or 3-D Fresnel hologram) that is representative of the 3-D object scene based at least in part on a multi-rate filtering of the sequence of sub-lines. In an aspect, the sequence of sub-lines can be decimated by a desired factor to facilitate reducing the data rate. To facilitate enabling the convolution process to generate the diffraction pattern of all of scan planes, the multi-rate filter component can employ an interpolation filter to suppress the empty gaps in the sequence of sub-lines resulting from the decimation of the sequence of sub-lines and up-sampling of the sub-line sequence after decimation. In another aspect, after the multi-rate filtering process is applied to the sequence of sub-lines, the diffraction pattern can be interfered with a reference beam (e.g., off-axis reference beam) to generate the off-axis Fresnel hologram of the 3-D object scene.

Turning to FIG. 22, illustrated is a flow diagram of an example method 2200 that can employ a multi-rate filter process to generate a hologram (e.g., Fresnel hologram) of a 3-D object scene in accordance with various aspects and embodiments of the disclosed subject matter. At 2202, a 3-D object scene can be segmented into a vertical stack of scan planes. The respective scan planes of the vertical stack can be representative of respective portions of the 3-D object scene. The respective scan planes can be associated with respective sub-lines in a sequence of sub-lines.

At 2204, a diffraction pattern can be generated based at least in part on the sequence of sub-lines. For instance, a diffraction pattern can be generated from all of the scan planes associated with the 3-D object scene, as more fully disclosed herein.

At 2206, the sequence of sub-lines can be decimated (e.g., down-sampled) by a desired factor (e.g., a predefined factor M). The decimation of the sub-line sequence can result in a number of empty spaces (e.g., an empty space for each sub-line that was removed due to decimation) in the sub-line sequence. The decimated sub-line sequence can be up-sampled to insert blank lines in between each pair of decimated sub-lines, which can result in empty gaps in between each pair of decimated sub-lines.

At 2208, each empty gap in between a pair of sub-lines in the sub-line sequence can be interpolated to suppress the empty gaps in the sub-line sequence. The multi-rate filter component can employ an interpolation filter to interpolate the sub-line sequence to suppress the empty gaps, which can improve the visual quality of the hologram over the degraded quality of the hologram that would have resulted had the sub-line sequence not been interpolated to suppress the empty gaps.

At 2210, the diffraction pattern associated with the sub-line sequence (e.g., after the interpolation filter is applied to the sub-line sequence) can be interfered with a reference beam to generate the hologram of the 3-D object scene. For instance, the diffraction pattern can be interfered with an off-axis plane reference beam to facilitate generating an off-axis Fresnel hologram. For example, the hologram H(x, y) can be generated in accordance with the following equation H(x, y)=D(x, y)R(y), wherein D(x, y) is the diffraction pattern and R(y) is the reference beam.

At 2212, the generated hologram can be displayed. For instance, a desired display component(s) can be employed to display the generated hologram (e.g., 3-D Fresnel hologram) so that the hologram can be displayed to users who desire to observe the hologram. For example, a plurality of display components can be employed to display the generated hologram from a variety of different angles.

FIG. 23 depicts a flow diagram of an example method 2300 that can employ FFTs to facilitate generating a hologram (e.g., Fresnel hologram) of a 3-D object scene in accordance with various aspects and embodiments of the disclosed subject matter. At 2302, a FFT(s) can be performed to convert the diffraction pattern D(x, y) associated with (e.g., representative of) the 3-D object scene, the stack of sub-lines O(x, y) associated with the diffraction pattern, and the function B(y). Thus, when the FFT is applied to the diffraction pattern, stack of sub-lines, and function B(y), the calculation of D(x, y)=O(x, y)*B(y) can become $\tilde{D}(x, e^{i\omega}) = \tilde{O}x, e^{iM\omega})\tilde{B}(e^{i\omega})$, wherein $\tilde{D}(x, e^{i\omega})$, $\tilde{O}(x, e^{iM\omega})$, and $\tilde{B}(e^{i\omega})$ can represent the fast Fourier transform FT{"function(s)-to-be-transformed"} of the diffraction pattern D(x, y), the stack of sub-lines O(x, y), and the function B(y), respectively. At 2304, an inverse FFT(s) (IFFT(s)) can be performed on the FFT of the diffraction pattern (e.g., $\tilde{D}(x, e^{i\omega})$) to facilitate generating the hologram (e.g., in accordance with Eq. (14)). At 2306, the IFFT of the FFT of the diffraction pattern can be interfered with the reference beam to generate the hologram (e.g., in accordance with Eq. (14)).

Figure 24:
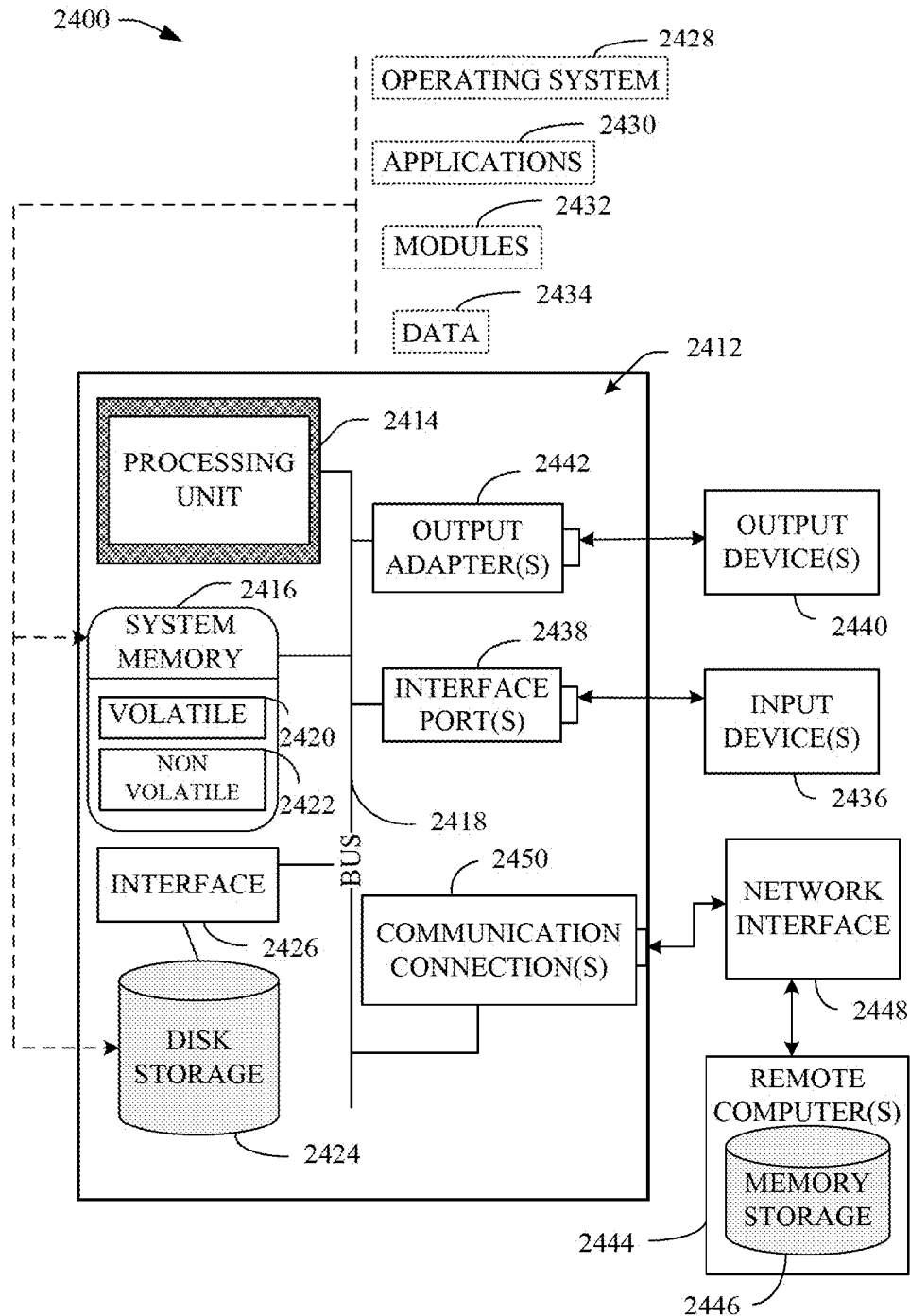
FIG. 24 is a schematic block diagram illustrating a suitable operating environment.
Figure 25:
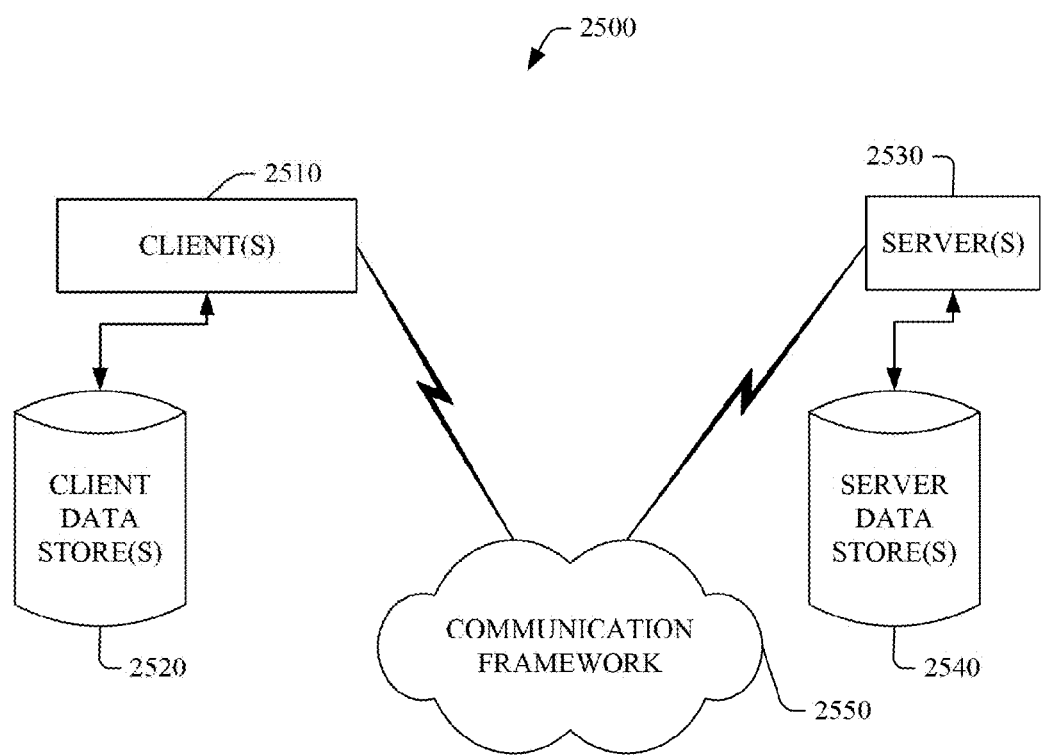
FIG. 25 is a schematic block diagram of a sample-computing environment.

In order to provide a context for the various aspects of the disclosed subject matter, FIGS. 24 and 25 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 24, a suitable environment 2400 for implementing various aspects of the claimed subject matter includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Dual microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable programmable ROM (EEPROM), or flash memory. Volatile memory 2420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2412 also includes removable/non-removable, volatile/nonvolatile computer storage media. FIG. 24 illustrates, for example, a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to the system bus 2418, a removable or non-removable interface is typically used, such as interface 2426).

It is to be appreciated that FIG. 24 describes software that acts as an intermediary between users and the basic computer resources described in the suitable operating environment 2400. Such software includes an operating system 2428. Operating system 2428, which can be stored on disk storage 2424, acts to control and allocate resources of the computer system 2412. System applications 2430 take advantage of the management of resources by operating system 2428 through program modules 2432 and program data 2434 stored either in system memory 2416 or on disk storage 2424. It is to be appreciated that the claimed subject matter can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapter 2442 is provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refers to the hardware/software employed to connect the network interface 2448 to the bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample-computing environment 2500 with which the subject disclosure can interact. The system 2500 includes one or more client(s) 2510. The client(s) 2510 can be hardware and/or software (e.g., threads, processes, computing devices). The system 2500 also includes one or more server(s) 2530. Thus, system 2500 can correspond to a two-tier client server model or a multi-tier model (e.g., client, middle tier server, data server), amongst other models. The server(s) 2530 can also be hardware and/or software (e.g., threads, processes, computing devices). The servers 2530 can house threads to perform transformations by employing the subject disclosure, for example. One possible communication between a client 2510 and a server 2530 may be in the form of a data packet transmitted between two or more computer processes.

The system 2500 includes a communication framework 2550 that can be employed to facilitate communications between the client(s) 2510 and the server(s) 2530. The client(s) 2510 are operatively connected to one or more client data store(s) 2520 that can be employed to store information local to the client(s) 2510. Similarly, the server(s) 2530 are operatively connected to one or more server data store(s) 2540 that can be employed to store information local to the servers 2530.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a hologram generator component (HGC) configured to convert a three-dimensional (3-D) object scene into a sequence of sub-lines and generate a Fresnel hologram representative of the 3-D object scene based at least in part on the sequence of sub-lines, wherein the HGC is further configured to generate a diffraction pattern from scan planes respectively corresponding to sub-lines in the sequence of sub-lines, and wherein the HGC further comprises a multi-rate filter component configured to employ an interpolation filter to interpolate at least one empty gap in the sequence of sub-lines to suppress the at least one empty gap, wherein the at least one empty gap results from an up-sample of the sequence of sub-lines; and
    at least one display component configured to present the Fresnel hologram.

2. The system of claim 1, wherein the HGC is further configured to decimate the sequence of sub-lines by a specified factor resulting in decimated sub-lines in the sequence of sub-lines to facilitate reduction of a data rate associated with generation of the Fresnel hologram.

3. The system of claim 2, wherein the HGC is further configured to up-sample the sequence of sub-lines to insert a specified number of blank sub-lines between pairs of the decimated sub-lines to realize a given sampling rate.

4. The system of claim 3, wherein the specified number of blank sub-lines is determined as a function of the specified factor.

5. The system of claim 1, wherein, in connection with the interpolation of the at least one empty gap in the sequence of sub-lines, the HGC is further configured to interpolate the at least one empty gap in the sequence of sub-lines based at least in part on at least one of convolution in a spatial domain or at least one fast Fourier transform in a frequency domain, wherein the at least one fast Fourier transform comprises at least one of a forward fast Fourier transform or an inverse fast Fourier transform.

6. The system of claim 5, wherein, in connection with the interpolation of the at least one empty gap in the sequence of sub-lines, the HGC is further configured to interpolate the at least one empty gap in the sequence of sub-lines employing a graphic processing unit (GPU) to perform the at least one fast Fourier transform in the frequency domain.

7. The system of claim 1, wherein a transfer function of the interpolation filter and a frequency spectrum of a reference wave are integrated into a single entity that is pre-computed in advance of the conversion of the 3-D object scene into the sequence of sub-lines, wherein, in connection with the interpolation of the at least one empty gap in the sequence of sub-lines, the HGC is further configured to interpolate the at least one empty gap based at least in part on the single entity to mitigate computation in generation of the Fresnel hologram.

8. The system of claim 1, wherein the HGC is further configured to interfere with the diffraction pattern with an off-axis plane reference beam to generate the Fresnel hologram, wherein the Fresnel hologram is an off-axis Fresnel hologram.

9. The system of claim 1, wherein the HGC is further configured to employ a Fresnel approximation to facilitate generation of the diffraction pattern.

10. The system of claim 1, wherein the at least one display component comprises at least one of a liquid crystal on silicon display, a liquid crystal display, a spatial light modulator, an autostereoscopic display, a multiple-section autostereoscopic display, or a holographic 3-D television display.

11. A method, comprising:
    converting, by a system comprising a processor, a three-dimensional (3-D) object scene into a sequence of sub-lines to facilitate generating a diffraction pattern representative of the 3-D object scene;

generating, by the system, a diffraction pattern from scan planes respectively corresponding to sub-lines in the sequence of sub-lines;

interpolating, by the system, at least one empty gap in the sequence of sub-lines to suppress the at least one empty gap based at least in part on a multi-rate filtering of the sequence of sub-lines, wherein the at least one empty gap results from an up-sampling of the sequence of sub-lines; and converting, by the system, the sequence of sub-lines to a hologram representative of the 3-D object scene based at least in part on the multi-rate filtering of the sequence of sub-lines.

12. The method of claim 11, further comprising:

segmenting, by the system, the 3-D object scene into a vertical stack of the scan planes, wherein the scan planes of the vertical stack correspond to respective sub-lines in the sequence of sub-lines.

13. The method of claim 11, further comprising:

down-sampling, by the system, the sequence of sub-lines by a specified factor to facilitate reducing a data rate associated with generation of the hologram;

up-sampling, by the system, the sequence of sub-lines, based at least in part on the specified factor, to insert a specified number of blank sub-lines in the sequence of sub-lines resulting in a same sampling rate between object waves and a function associated with the diffraction pattern; and performing, by the system, a convolution to facilitate generating the hologram.

14. The method of claim 13, wherein the interpolating the at least one empty gap in the sequence of sub-lines to suppress the at least one empty gap further comprises:

interpolating, by the system, the sequence of sub-lines after the up-sampling of the sequence of sub-lines to suppress the at least one empty gap of the sequence of sub-lines, wherein the at least one empty gap is due at least in part to the up-sampling of the sequence of sub-lines.

15. The method of claim 14, further comprising:

transforming, by the system, the diffraction pattern into a frequency domain to facilitate mitigating computation operations in rendering the hologram;

applying, by the system, a fast Fourier transform to at least one of the diffraction pattern, the sequence of sub-lines, or a function associated with the diffraction pattern, to facilitate the interpolating of the sequence of sub-lines and the mitigating of the computation operations including multiplication operations associated with the generating of the hologram; and applying, by the system, an inverse fast Fourier transform to a result of the fast Fourier transform of at least one of the diffraction pattern, the sequence of sub-lines, or the function associated with the diffraction pattern.

16. The method of claim 15, further comprising:

pre-computing, by the system, at least the fast Fourier transform of the function associated with the diffraction pattern to mitigate the computation operations associated with the generating of the hologram.

17. The method of claim 11, further comprising:

applying, by the system, interference to the diffraction pattern with an off-axis plane reference beam to generate the hologram, wherein the hologram is an off-axis Fresnel hologram; and displaying, by the system, the hologram.

18. A system, comprising:

means for segmenting a three-dimensional (3-D) object scene into a vertical stack of scan planes including means for converting the 3-D object scene into a sequence of sub-lines, wherein scan planes of the vertical stack correspond to respective sub-lines in the sequence of sub-lines;

means for generating a diffraction pattern based at least in part on the scan planes;

means for multi-rate filtering the sequence of sub-lines comprising means for interpolating at least one empty gap in the sequence of sub-lines to suppress the at least one empty gap, wherein the at least one empty gap results from an up-sampling of the sequence of sub-lines; and means for converting the sequence of sub-lines into a Fresnel hologram representative of the 3-D object scene.

19. The system of claim 18, further comprising:

means for down-sampling the sequence of sub-lines by a defined factor to facilitate reducing a data rate associated with generation of the Fresnel hologram;

means for up-sampling the sequence of sub-lines, based at least in part on the defined factor, to insert a defined number of blank sub-lines in the sequence of sub-lines resulting in a same sampling rate between object waves and a function associated with the diffraction pattern; and means for performing a convolution to facilitate generating the Fresnel hologram.

20. The system of claim 18, wherein the means for interpolating at least one empty gap in the sequence of sub-lines further comprises means for interpolating the sequence of sub-lines after up-sampling of the sequence of sub-lines by the means for up-sampling to suppress the at least one empty gap of the sequence of sub-lines, wherein the at least one empty gap is due at least in part to the up-sampling of the sequence of sub-lines.

* * * * *